(12) United States Patent
Uno

(10) Patent No.: US 10,279,813 B2
(45) Date of Patent: May 7, 2019

(54) VEHICULAR DRIVE ASSIST SYSTEM

(71) Applicant: TOYOTA JIDOSHA KABUSHIKI KAISHA, Toyota-shi, Aichi-ken (JP)

(72) Inventor: Satoshi Uno, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/501,242

(22) PCT Filed: Aug. 5, 2015

(86) PCT No.: PCT/IB2015/001406
§ 371 (c)(1),
(2) Date: Feb. 2, 2017

(87) PCT Pub. No.: WO2016/020748
PCT Pub. Date: Feb. 11, 2016

(65) Prior Publication Data
US 2017/0217441 A1    Aug. 3, 2017

(30) Foreign Application Priority Data

Aug. 7, 2014  (JP) .................................. 2014-161190

(51) Int. Cl.
*B60W 40/06* (2012.01)
*B60W 10/20* (2006.01)
*B60W 10/04* (2006.01)
*G01C 21/32* (2006.01)
(Continued)

(52) U.S. Cl.
CPC ............ *B60W 40/06* (2013.01); *B60W 10/04* (2013.01); *B60W 10/18* (2013.01); *B60W 10/20* (2013.01);
(Continued)

(58) Field of Classification Search
CPC ...... B60W 40/06; B60W 10/18; B60W 10/20; B60W 10/04; B60W 2710/18;
(Continued)

(56) References Cited

U.S. PATENT DOCUMENTS

2007/0208496 A1*  9/2007  Downs ................. G08G 1/0112
                                                              701/117
2008/0071465 A1*  3/2008  Chapman ........... G01C 21/3691
                                                              701/117
(Continued)

FOREIGN PATENT DOCUMENTS

CN  102289936 A  12/2011
JP  2007-149054 A  6/2007
(Continued)

*Primary Examiner* — Yonel Beaulieu
*Assistant Examiner* — Martin A Weeks
(74) *Attorney, Agent, or Firm* — Oliff PLC

(57) ABSTRACT

A vehicular drive assist system performs drive assist for a vehicle traveling in each predetermined area while receiving a feedback on evaluation relating to ease of travel on a road in each of the areas. In the system, a management center performs evaluation of ease of travel on a road for each of the areas on the basis of information obtained from the vehicle and feeds back the evaluation result to the vehicle. In this case, a variation width of the evaluation relating to ease of travel is restricted on a basis of static factors of road environment for each of the areas.

13 Claims, 13 Drawing Sheets

(51) Int. Cl.
*B60W 10/18* (2012.01)
*G08G 1/01* (2006.01)
*G08G 1/0968* (2006.01)
*G01C 21/36* (2006.01)

(52) U.S. Cl.
CPC ......... *G01C 21/32* (2013.01); *G01C 21/3641* (2013.01); *G08G 1/0112* (2013.01); *G08G 1/096805* (2013.01); *G08G 1/096811* (2013.01); *G08G 1/096827* (2013.01); *G08G 1/096833* (2013.01); *B60W 2710/06* (2013.01); *B60W 2710/18* (2013.01); *B60W 2710/20* (2013.01)

(58) Field of Classification Search
CPC .......... B60W 2710/20; B60W 2710/06; G08G 1/096833; G08G 1/0112
See application file for complete search history.

(56) References Cited

U.S. PATENT DOCUMENTS

| | | | | |
|---|---|---|---|---|
| 2009/0082917 | A1* | 3/2009 | Adachi | G08G 1/0104 701/420 |
| 2016/0117921 | A1* | 4/2016 | D'Amato | G08G 1/0112 701/117 |

FOREIGN PATENT DOCUMENTS

| | | |
|---|---|---|
| JP | 2010-008271 A | 1/2010 |
| JP | 2010-203975 A | 9/2010 |
| WO | 2007/103180 A2 | 9/2007 |

\* cited by examiner

FIG. 2

| EASE OF TRAVEL | DIFFICULT TO TRAVEL | | | EASY TO TRAVEL | |
|---|---|---|---|---|---|
| | E | D | C | B | A |
| EVALUATION VALUE | 1~3 | 4~5 | 6~8 | 9~11 | 12~15 |

FIG. 3

| STATIC ENVIRONMENT FACTORS | | CORRECTION AMOUNT OF INITIAL VALUE OF EVALUATION CRITERION |
|---|---|---|
| A1a — TRAVEL INHIBITING FACTORS | UTILITY POLES | -3 |
| | UNEVEN ROAD SURFACE | -2 |
| | ROAD WEAR | -1 |
| A2a — TRAVEL ASSIST FACTORS | SHOULDERS | +1 |
| | DROP-OFF AND PICK-UP LOCATIONS | +2 |
| | SIDEWALKS | +3 |
| | STREET LIGHTING | +4 |
| | MIRRORS | +5 |

FIG. 4

| SITE | INITIAL VALUE OF EVALUATION CRITERION | STATIC ENVIRONMENT FACTORS | | | | | | | | CORRECTION VALUE OF INITIAL VALUE OF EVALUATION CRITERION |
|---|---|---|---|---|---|---|---|---|---|---|
| | | A1a TRAVEL INHIBITING FACTORS | | | A2a TRAVEL ASSIST FACTORS | | | | | |
| | | UTILITY POLES | UNEVEN ROAD SURFACE | ROAD WEAR | SHOULDERS | DROP-OFF AND PICK-UP LOCATIONS | SIDEWALKS | STREET LIGHTING | MIRRORS | |
| P1 | 4(D) | | | | +1 | +2 | − | − | − | 7(C) |
| P2 | 12(A) | − | -2 | − | | | | | | 10(B) |
| P3 | 2(E) | | | | − | +2 | − | +4 | − | 8(C) |

FIG. 5

| DRIVING CHARACTERISTIC | DIFFICULT TO TRAVEL | | | EASY TO TRAVEL | |
|---|---|---|---|---|---|
| | E | D | C | B | A |
| INDEX VALUE | 3 | 4 | 5~7 | 8 | 9 |

| | SITE | EFFECT OF DISTURBANCE FACTOR | INDEX VALUE | FREQUENCY OF ACCELERATION OPERATION | FREQUENCY OF BRAKE OPERATION | FREQUENCY OF STEERING OPERATION |
|---|---|---|---|---|---|---|
| DATA 1 | P1 | SMALL | 9(A) | SMALL (3) | SMALL (3) | SMALL (3) |
| DATA 2 | P2 | | 6(C) | MEDIUM (2) | MEDIUM (2) | MEDIUM (2) |
| DATA 3 | P3 | | 4(D) | MEDIUM (2) | LARGE (1) | LARGE (1) |
| DATA 4 | P1 | LARGE | 7(C) | SMALL (3) | MEDIUM (2) | MEDIUM (2) |
| DATA 5 | P2 | | 8(B) | SMALL (3) | MEDIUM (2) | MEDIUM (3) |
| DATA 6 | P3 | | 3(E) | LARGE (1) | LARGE (1) | LARGE (1) |
| DATA 7 | P1 | ENTIRE EFFECT | 8(B) | | | |
| DATA 8 | P2 | | 7(C) | | | |
| DATA 9 | P3 | | 3(E) | | | |

FIG. 7

| DISTURBANCE FACTORS (B1a) | VEHICLE STATE (B3a) | POSITIONAL RELATIONSHIP (DISTANCE) (B2a) | CORRECTION AMOUNT OF EVALUATION CRITERION (T) |
|---|---|---|---|
| PEDESTRIANS | USUAL | SHORT | -2 |
| | | LONG | -1 |
| | EXCEPTION (DARK ROAD) | SHORT | -4 |
| | | LONG | -2 |
| BICYCLES | USUAL | SHORT | -3 |
| | | LONG | -2 |
| REGULAR VEHICLES | USUAL | SHORT | -2 |
| | | LONG | -1 |
| | EXCEPTION (DARK ROAD) | SHORT | +3 |
| | | LONG | +1 |
| LARGE VEHICLES | USUAL | SHORT | -4 |
| | | LONG | -2 |
| STREET PARKING | USUAL | SHORT | -2 |
| | | LONG | -1 |
| BICYCLE PARKING | USUAL | SHORT | -2 |
| | | LONG | -1 |
| FALLEN OBJECTS | USUAL | SHORT | -3 |
| | | LONG | -2 |

FIG. 8

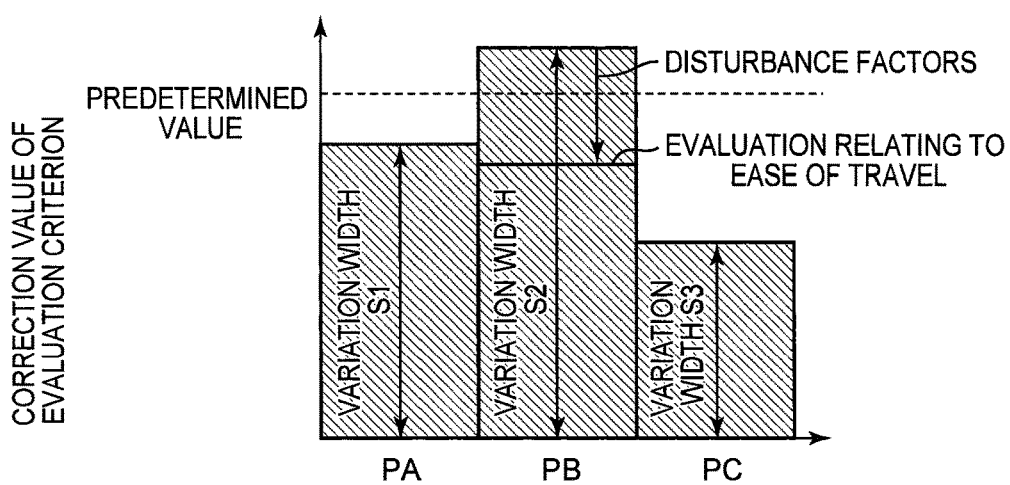

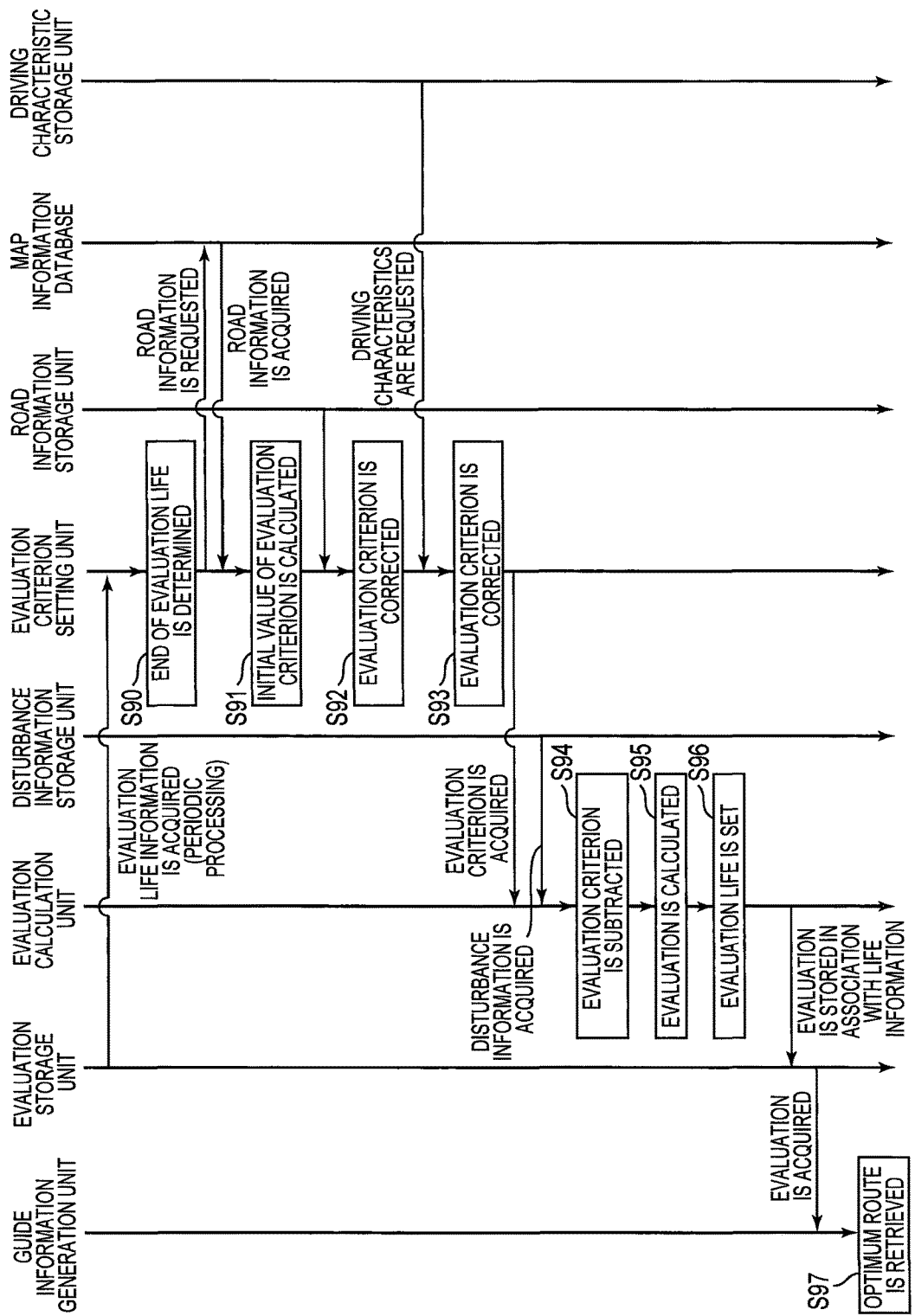

VEHICULAR DRIVE ASSIST SYSTEM

BACKGROUND OF THE INVENTION

1. Field of the Invention

The invention relates to a vehicular drive assist system that performs vehicular drive assist on the basis of evaluation relating to ease of travel on a road.

2. Description of Related Art

For example, a system disclosed in Japanese Patent Application Publication No. 2007-149054 (JP 2007-149054 A) is available as a vehicular drive assist system of this type. In this system, a tendency of a vehicular state for each predetermined area is calculated on the basis of information, for example, such as a brake pedal operation frequency and steering wheel operation speed, which has been collected from a plurality of vehicles during the running of the vehicles, and the ease of travel on the road is evaluated for each corresponding area by statistically processing the calculated tendency. The drive assist is performed as the vehicle travels in each corresponding area on the basis of such evaluation.

However, in the conventional systems, including the system disclosed in the abovementioned document, the evaluation relating to ease of travel usually changes in response to factors that vary dynamically at the times of the evaluation, for example, the presence or absence of a preceding vehicle or a pedestrian. Further, even in the evaluation in which statistical processing is performed, as described hereinabove, the effects of factors that change each time the road is traveled by an individual vehicle are summed up. Therefore, when an attempt is made to apply such an evaluation uniformly, the appropriate evaluation of the ease of travel cannot be fed back when the drive assist is performed. Thus, for example, the ease of travel can decrease excessively for some areas.

SUMMARY OF THE INVENTION

The invention has been created with the foregoing in view, and it is an objective thereof to provide a vehicular drive assist system in which vehicular drive assist is performed with respect to each area on the basis of more appropriate evaluation of the ease of travel.

The vehicular drive assist system according to an aspect of the present invention, performs drive assist for a vehicle traveling in each predetermined area while receiving a feedback on evaluation relating to ease of travel on a road in each of the areas, wherein a variation width of the evaluation relating to ease of travel, which is to be fed back, is restricted on the basis of static factors of road environment for each of the areas.

The number of lanes and speed limit typically differ among the roads, and evaluation relating to ease of travel on a road also varies according to such differences. Further, when the so-called disturbances, which are factors changing dynamically with the passage of time, are added, the ease of driving the vehicle also tends to change according to the degree of the disturbances. In this respect, by setting the variation width of evaluation relating to ease of travel on a road to vary actively depending on static factors of road environment for each area, for example, such as the presence or absence of a road mirror, as in the abovementioned configuration, it is possible to suppress the occurrence of a large shift in evaluation at least such as a deviation from the set variation widths caused by the disturbances or the like. Thus, more appropriate evaluation relating to ease of travel can be fed back for drive assist.

In the abovementioned vehicular drive assist system, information relating to static factors of road environment may be constituted by information relating to static factors of road environment which are included in map information and information relating to static factors of road environment which are not included in map information; the evaluation relating to ease of travel may be provisionally determined on the basis of the information relating to static factors of road environment which are included in map information; and the provisionally determined evaluation may be corrected on the basis of the information relating to static factors of road environment which are not included in map information.

With the above-described configuration, the evaluation relating to ease of travel is set for each area using not only information relating to static factors of road environment which are included in map information, but also information relating to static factors of road environment which are not included in map information. Therefore, the reliability of general usage of the evaluation relating to ease of travel which is based on static factors of road environment with respect to a large number of vehicles is increased.

In the vehicular drive assist system, the information relating to static factors of road environment which are not included in map information may include travel inhibiting factors which degrade the ease of travel on the road and travel assist factors which improve the ease of travel on the road; the provisionally determined evaluation may be corrected downward on the basis of the travel inhibiting factors; and the provisionally determined evaluation may be corrected upward on the basis of the travel assist factors.

With the above-described configuration, as a result of classifying the information relating to static factors of road environment which are not included in map information into travel inhibiting factors and travel assist factors, it is possible to correct the evaluation relating to ease of travel on the basis of static factors of road environment in a mode suitable for each classified factor.

In the vehicular drive assist system, the downward correction based on the travel inhibiting factors may be performed under condition that the provisionally determined evaluation shows a tendency toward an easy travel; and the upward correction based on the travel assist factors may be performed under condition that the provisionally determined evaluation shows a tendency toward a difficult travel.

Typically, even if the evaluation relating to ease of travel through a certain area is further increased when the certain area inherently tends to be easy to travel, the impression of the driver that this area is easy to travel through is not changed and such correction of the evaluation would not be that useful for the driver of the vehicle. Likewise, even if the evaluation relating to ease of travel through a certain area is further decreased when a certain area inherently tends to be difficult to travel, the impression of the driver that this area is difficult to travel through is not changed and such correction of the evaluation would not be that useful for the driver of the vehicle. Accordingly, with the above-described configuration, when a certain area inherently tends to be easy to travel through, downward correction based on the travel inhibiting factors is selectively performed without performing the upward correction based on the travel assist factors in this area. Likewise, when a certain area inherently tends to be difficult to travel through, upward correction based on the travel assist factors is selectively performed without performing the downward correction based on the travel inhibiting factors in this area. Thus, the factors used for correcting the evaluation relating to ease of travel on the basis of static factors of road environment are restricted according to the ease of travel in each area. Therefore, the unnecessary increase in the processing load on the entire system which is required to correct the evaluation relating to ease of travel which is based on the static factors of road environment is suppressed.

In the vehicular drive assist system, the information relating to static factors of road environment which are not included in map information may be acquired while the vehicle is running. With such a configuration, information relating to static factors of road environment in the area through which the vehicle frequently travels is updated to the newest information with a comparatively high frequency. Therefore, when the information relating to static factors of road environment in the area changes within a certain period, the reliability of general usage of the evaluation relating to ease of travel which is based on static factors of road environment in the same area for a large number of vehicles is increased.

In the vehicular drive assist system, correction calculation may be performed on the evaluation relating to ease of travel by taking into account disturbance factors that change dynamically when the vehicle travels through each area.

With such a configuration, the evaluation relating to ease of travel in each area is corrected by taking into account individually the disturbance factors that are added for each vehicle. Therefore, drive assist corresponding to actual state of individual vehicles can be easily performed for each area on the basis of such evaluation. Further, in this case, as described hereinabove, the correction amount of evaluation relating to ease of travel, which corresponds to the disturbance factors, is fit in a range of variation width which is restricted by static factors of road environment for each area.

In the vehicular drive assist system, an amount of correction of the evaluation relating to ease of travel, which corresponds to the disturbance factors, may be determined in advance for each disturbance factor affecting the ease of travel on the road.

With such a configuration, the evaluation relating to ease of travel is corrected while taking into account individually the effects produced by individual disturbance factors on the ease of travel on the road. Therefore, the evaluation which better reflects the actual state of individual vehicles is obtained.

In the vehicular drive assist system, when the disturbance factors are located around a vehicle, a correction amount corresponding to each of positional relationships between the disturbance factors and the vehicle may be selected.

With such a configuration, the evaluation relating to ease of travel is corrected while taking into account the effects produced on the ease of travel on the road for each positional relationship between the disturbance factors around the vehicle and the vehicle. Therefore, the evaluation which better reflects the actual state of individual vehicles is obtained.

In the vehicular drive assist system, when the disturbance factors and a state of the vehicle are associated with each other, a correction amount corresponding to each combination of the associated disturbance factors and the state of the vehicle may be selected.

With such a configuration, when a certain disturbance factor produces a special effect on the ease of travel on the road for a vehicle state, the evaluation relating to ease of travel is corrected by taking into account this vehicle state. Therefore, the evaluation which better reflects the actual state of individual vehicles is obtained.

In the vehicular drive assist system, when the disturbance factor assists the ease of travel on the road for the state of the vehicle, the evaluation relating to ease of travel may be corrected to be higher according to the disturbance factor.

With such a configuration, when a certain disturbance factor, for example, a preceding vehicle during nighttime in a suburb, assists the ease of travel on the road for the vehicle state, the evaluation relating to ease of travel is corrected according to the disturbance factor by taking into account this vehicle state so as to be higher than in the case of another vehicle state. Therefore, the evaluation which better reflects the actual state of individual vehicles is obtained.

In the vehicular drive assist system, correction calculation that takes into account a disturbance factor that changes dynamically when the vehicle travels through an area may be executed only when the variation width of the evaluation relating to ease of travel is equal to or greater than a predetermined value in the area.

Typically, when the variation width of evaluation relating to ease of travel in a certain area is small, the impression of the driver of the vehicle which relates to the ease of travel in this area practically does not change even when the ease of travel in the area somewhat changes in response to a disturbance factor within the range of this variation width. Therefore, in such a case, even when the evaluation relating to ease of travel is corrected according to the disturbance factor, such correction would not be that useful for the driver of the vehicle. Accordingly, with the above-described configuration, the correction calculation that takes into account disturbance factors that are present when the vehicle travels through an area is performed only when the variation width of the evaluation relating to ease of travel is equal to or greater than a predetermined value in this area. As a result, the unnecessary increase in the processing load on the entire system which is required to correct the evaluation relating to ease of travel according to disturbance factors is suppressed.

In the vehicular drive assist system, when a degree of separation of a tendency of ease of travel, which is based on evaluation relating to ease of travel in a certain specific area, and a tendency of ease of travel, which is based on driving characteristics of the vehicle corresponding to the same area, is equal to or greater than a predetermined value, the evaluation relating to ease of travel in the same area may be corrected such that the degree of separation is decreased.

With such a configuration, driving characteristics of the vehicle which strongly reflect the actual state of ease of travel when the vehicle travels through a certain area are taken into account, and the evaluation relating to ease of travel which has been calculated on the basis of information relating to static factors of road environment in each area is corrected as necessary. Therefore, since the evaluation relating to ease of travel is in line with the actual state to a greater degree, the reliability of general usage of such evaluation relating to ease of travel which is based on static factors of road environment with respect to a large number of vehicles is further increased.

In the vehicular drive assist system, the driving characteristics of the vehicle may be set in association with information on disturbance factors of a vehicle when the driving characteristics are acquired; a driving characteristic that is acquired when the number of disturbance factors of the vehicle is comparatively small may be extracted from among the driving characteristics of the vehicle corresponding to a certain specific area on condition that the evaluation relating to ease of travel in this area shows a tendency toward an easy travel; and the degree of separation may be determined with respect to a tendency of ease of travel, which is based on the extracted driving characteristic, and a tendency of ease of travel, which is based on the evaluation relating to ease of travel in the same area.

Usually, when a certain area tends to be easy to travel through, the ease of travel in this area is easily affected by disturbance factors. Therefore, it is desirable that with respect to such an area, a driving characteristic be extracted which is acquired when the disturbance factors of the vehicle are small, from among the driving characteristics. Meanwhile, when a certain area tends to be difficult to travel through, the ease of travel in this area is hardly affected by the disturbance factors. Therefore, with respect to such an area, it is hardly necessary to take into account the disturbance factors of the vehicle when acquiring the driving characteristics. Accordingly, in the above-descried configuration, the driving characteristics of a certain area are extracted while taking into account the disturbance factors on condition that this area tends to be easy to travel through. Therefore, the driving characteristics that stronger reflect the ease of travel for each area can be extracted, and the evaluation relating to ease of travel can be better brought in line with the actual state. Further, since a case in which the driving characteristic is extracted by taking into account the presence/absence of the disturbance factors is restricted with consideration for the necessity thereof, this is one more reason why the unnecessary increase in the processing load on the entire system which is required to extract the driving tendency is suppressed.

In the vehicular drive assist system, the evaluation relating to ease of travel may be updated for each area on the basis of a preset life, and when the evaluation relating to ease of travel in a specific area shows a tendency toward an easy travel, a life of evaluation of this area may be set to be shorter.

Typically, if the ease of travel of this area changes when a certain area tends to be easy to travel through, the impression of the driver of the vehicle relating to ease of travel in this area changes significantly. Therefore, with respect to the evaluation of ease of travel in such an area, an update suited to the actual circumstances of each case is particularly needed. Accordingly, with the above-described configuration, when a certain area tends to be easy to travel through, the life of evaluation relating to ease of travel is set to be shorter. As a result, the evaluation relating to ease of travel is prevented from deviating from the actual state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic diagram illustrating the correspondence relationship between the evaluation value of ease of travel on a road and a tendency of ease of travel;

FIG. 3 is a schematic diagram illustrating the correspondence relationship between static factors of road environment and the correction amount of the initial value of the evaluation criterion;

FIG. 4 is a schematic diagram illustrating an example of a mode for correcting the initial value of the evaluation criterion which is based on static factors of road environment;

FIG. 5 is a schematic diagram illustrating the correspondence relationship between the index value of a driving characteristic and a tendency of ease of travel;

FIG. 6 is a schematic diagram illustrating an example of a mode of associating driving characteristics with disturbance information;

FIG. 7 is a schematic diagram illustrating an example of a subtraction value table;

FIG. 8 is a schematic diagram illustrating an example of a mode of restricting the variation width of the evaluation criterion;

FIG. 17 is a sequence chart illustrating the flow of information when the vehicular drive assist system of the fifth embodiment executes the drive assist processing.

DETAILED DESCRIPTION OF EMBODIMENTS

First Embodiment

The first embodiment of the vehicular drive assist system will be explained hereinbelow with reference to the appended drawings. The vehicular drive assist system of the embodiment is constituted by a plurality of vehicles which serve as objects and a management center that manages travel information on the plurality of vehicles via wireless communication. The management center evaluates the ease of travel on the road for each predetermined area on the basis of information relating to static factors of road environment. The management center also collects for each vehicle, via wireless communication, information on disturbance factors which is acquired each time the plurality of vehicles travels through each area, and corrects the evaluation relating to ease of travel in each area on the basis of the collected information on disturbance factors for each vehicle. The drive assist is performed when the vehicle travels through each corresponding area on the basis of the evaluation of ease of travel in each area which is fed back from the management center.

Figure 1:
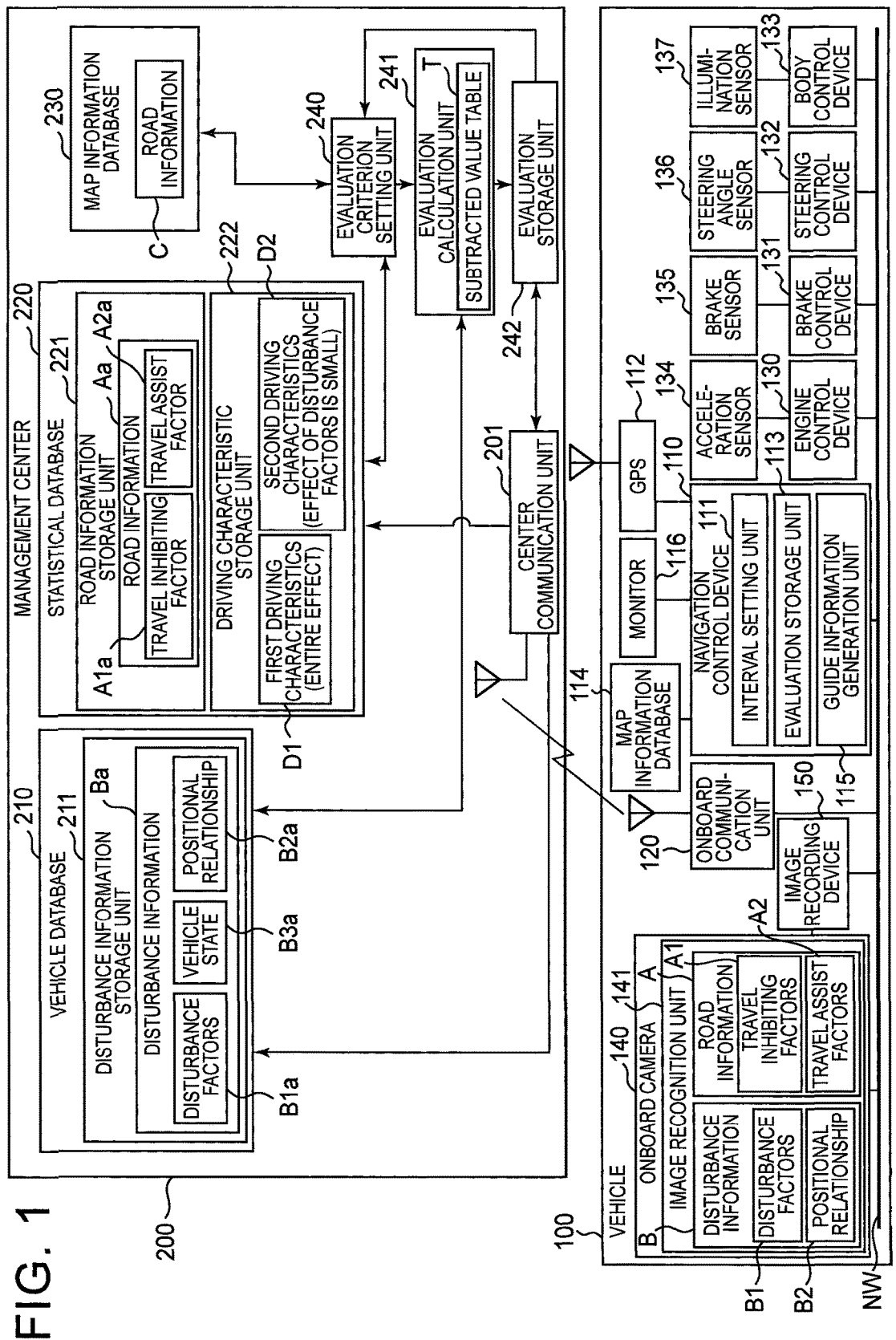
FIG. 1 is a block-diagram illustrating the general configuration of the first embodiment of a vehicular drive assist system.

More specifically, as depicted in FIG. 1, a vehicle 100 is provided with a navigation control device 110 that performs route guidance as a drive assist for the vehicle 100. The navigation control device 110 is provided with an interval setting unit 111 that sets an interval between a starting point and destination point of the vehicle 100 as a travel interval for the vehicle 100. Further, a global positioning system (GPS) 112 that acquires position information on the present location of the vehicle 100 is installed in the navigation control device 110. The navigation control device 110 also performs wireless transmission of the position information on the present location of the vehicle 100 which has been acquired from the GPS 112 to a management center 200 through an onboard communication unit 120 installed on the vehicle 100.

The navigation control device 110 is provided with an evaluation storage unit 113 that stores information on the evaluation relating to ease of travel on a road which is fed back from the management center 200. The evaluation relating to ease of travel on a road is set for each intersection on a map that has been registered in a map information database 114, and also for each road interval between the intersections. The navigation control device 110 also retrieves an optimum route for travel intervals of the vehicle 100 by using a Dykstra method, or the like, with reference to the evaluation relating to ease of travel on a road which has been stored in the evaluation storage unit 113. The navigation control device 110 also generates guide information on the retrieved optimum route through a guide information generation unit 115 and outputs the generated guide information to be displayed on a monitor 116.

Further, in the vehicle 100, onboard control devices for controlling the operation of various onboard devices are connected to each other via a vehicle network NW, for example, such as a controller area network (CAN). In addition to the above-mentioned navigation control device 110, the onboard control devices include an engine control device 130 that controls engine operation, a brake control device 131 that controls brake operation, a steering control device 132 that controls steering (steering wheel) operation assist, and a body control device 133 that controls the operation of lights and the like. An accelerator sensor 134 that detects the depression amount of an accelerator pedal by a driver is connected to the engine control device 130. A brake sensor 135 that detects the depression amount of a brake pedal by the driver is connected to the brake control device 131. A steering angle sensor 136 that detects the steering amount of a steering wheel by the driver is connected to the steering control device 132. An illumination sensor 137 that detects the illumination of ambient light from the outside of the vehicle is connected to the body control device 133. On the basis of the outputs from those onboard control devices, the vehicle 100 performs wireless transmission of drive conditions, for example, an accelerator operation frequency, a brake operation frequency, and a steering wheel operation frequency or operation speed, or the state of the vehicle, such as the brightness outside of the vehicle, to the management center 200 through the onboard communication unit 120.

An onboard camera 140 that monitors the vehicle surroundings and an image recording device 150 that records the image captured by the onboard camera 140 are also connected to the vehicle network NW. The onboard camera 140 has an image recognition unit 141 that performs image recognition processing of the images captured during the running of the vehicle 100, thereby acquiring road information A indicating information relating to static factors of road environment around the vehicle and disturbance information B indicating information relating to dynamic factors around the vehicle. In this case, the road information A includes travel inhibiting factors A1 that degrade the ease of travel on the road, such as utility poles, uneven road surface, and road wear, and travel assist factors A2 that improve the ease of travel on the road, such as shoulders, drop-off and pick-up locations, sidewalks, street lighting, and mirrors. The disturbance information B includes disturbance factors B1 that degrade the ease of travel on the road, such as pedestrians, bicycles, regular vehicles, large vehicles, street parking, bicycle parking, and fallen objects, and a positional relationship B2 of (distance between) those disturbance factors B1 and the vehicle 100. The onboard camera 140 recognizes the types of objects around the vehicle through the image recognition processing, thereby specifying the disturbance factors B1. The onboard camera 140 detects the positional relationship B2 of the specified disturbance factors B1 and the vehicle 100 by using for a captured image a phase difference detection method, contrast detection method, or time of flight (TOF) method. The vehicle 100 performs wireless transmission of the road information A or disturbance information B on the vehicle surroundings, which is based on image recognition performed by the onboard camera 140, to the management center 200 through the onboard communication unit 120. The vehicle 100 also periodically uploads the images accumulated in the image recording device 150 to the management center 200 through the onboard communication unit 120.

The navigation control device 110 reads at all times, from the evaluation storage unit 113, the evaluation relating to ease of travel on a road immediately before the vehicle 100 runs therethrough. For example, when route guidance is performed from the starting point to the destination point through the interval setting unit 111, the road immediately before the vehicle 100 runs therethrough can be predicted on the basis of the information on the route guidance. When the travel route on which the vehicle 100 frequently travels has been learned, the road immediately before the vehicle 100 runs therethrough can be also predicted on the basis of information on the learned travel route.

In the embodiment, as depicted in FIG. 2, the evaluation relating to ease of travel on a road is classified into five ranks "A" to "E" on the basis of the evaluation values thereof. Among them, when the evaluation relating to ease of travel on a road is of the rank "A" or "B", the road tends to be easy to travel on, and when the evaluation relating to ease of travel on a road is of ranks "C" to "E", the road tends to be difficult to travel.

The vehicle 100 acquires the disturbance information B with the onboard camera 140 during the running through the road, on condition that the evaluation relating to ease of travel on the road immediately before the vehicle runs therethrough shows a tendency toward an easy travel. This is because, when the road tends to be difficult to travel immediately before the vehicle 100 travels thereon, the ease of travel on the road is hardly affected by the disturbance factors B1 and, therefore, it is hardly necessary to acquire the disturbance information B corresponding to the road. In particular, since the number of factors in the disturbance information B is larger than that in the road information A, a large processing load is required for acquiring the disturbance information B through the onboard camera 140. For this reason, the case in which such disturbance information B is acquired is restricted according to the evaluation relating to ease of travel on the road immediately before the vehicle 100 runs therethrough, whereby the processing load in the vehicle 100 is prevented from increasing above necessary.

Further, when the evaluation relating to ease of travel on a road immediately before the running of the vehicle 100 shows a tendency toward a difficult travel, the processing load can be provided with a margin corresponding to the unnecessary acquisition of the disturbance information B with the onboard camera 140. Therefore, the vehicle 100 can use this margin of processing load for uploading the images accumulated in the image recording device 150 to the management center 200 through the onboard communication unit 120, or for performing, with the onboard camera 140, the image recognition processing of the images accumulated in the image recording device 150.

Meanwhile, as depicted in FIG. 1, the management center 200 manages the travel information on the plurality of vehicles 100 and includes a center communication unit 201 that receives various types of information from those vehicles 100. The center communication unit 201 stores various types of information received from the vehicle 100 in a vehicle database 210 in vehicle units on the basis of vehicle ID included in the received information. Disturbance information Ba acquired by each vehicle 100 through the onboard camera 140 is stored in a disturbance information storage unit 211 in the vehicle database 210. In the disturbance information Ba, the disturbance factors B1$a$ or positional relationships B2$a$ of those disturbance factors B1$a$ with the vehicle 100 are associated with a vehicle state B3$a$ based on the outputs from various vehicle control devices which are obtained at the time those types of information are acquired.

The center communication unit 201 also stores various types of information received from a plurality of vehicles 100 as statistical information in the statistical database 220. In the statistical database 220, road information Aa for each predetermined area which has been received by a plurality of vehicles 100 through the onboard cameras 140 during the running of the vehicles is collected through the center communication unit 201, and the collected road information Aa is classified into travel inhibiting factors A1$a$ and travel assist factors A2$a$ and stored in a road information storage unit 221.

The management center 200 also uses road information C included in the map information registered in a map information database 230 and road information Aa stored in the road information storage unit 221 of the statistical database 220 to set an evaluation criterion, which is a criterion for evaluating the ease of travel in each area, through an evaluation criterion setting unit 240.

More specifically, the evaluation criterion setting unit 240 provisionally determines the initial value of the evaluation criterion by using the road information C representing information relating to static factors of road environment which is included in the map information registered in the map information database 230. In this case, the initial value of the evaluation criterion is provisionally determined on the basis of the number of lanes, speed limit, road gradient, curve curvature, density of traffic lights, and density of intersections in the target area. Further, the evaluation criterion setting unit 240 corrects the provisionally determined initial value of the evaluation criterion by using the road information Aa stored in the road information storage unit 221 of the statistical database 220.

In this case, as depicted in FIG. 3, the road information Aa includes travel inhibiting factors A1$a$ that degrade the ease of travel on the road, such as utility poles, uneven road surface, and road wear in the target area and travel assist factors A2$a$ that improve the ease of travel on the road, such as shoulders, drop-off and pick-up locations, sidewalks, street lighting, and mirrors in the same area. The correction amount of the initial value of the evaluation criterion is defined on the basis of those travel inhibiting factors A1$a$ and travel assist factors A2$a$. In the embodiment, the correction amount that differs among the factors can be defined for either of the travel inhibiting factors A1$a$ and travel assist factors A2$a$.

When the initial value of the evaluation criterion in the target area shows that this area tends to be easy to travel through, the evaluation criterion setting unit 240 checks the presence/absence of the travel inhibiting factors A1$a$ corresponding to this area, but does not check the presence/absence of the travel assist factors A2$a$ corresponding to this area. This is because, the impression of the driver that this area is easy to travel through is not changed by an additional increase in the evaluation criterion when the target area inherently tends to be easy to travel through, and such correction of the evaluation criterion would not be that useful for the driver of the vehicle.

For example, in the example depicted in FIG. 4, the initial value "12" of the evaluation criterion in a site P2 indicates that the site P2 tends to be easy to travel through. Therefore, only the presence/absence of the travel inhibiting factors A1$a$ corresponding to the site P2 is checked. In this example, since the "UNEVEN ROAD SURFACE" is included as the travel inhibiting factor A1$a$ corresponding to the site P2, a correction value "10" of the evaluation criterion in the site P2 is calculated by correcting the initial value "12" of the evaluation criterion by using the correction amount "−2" corresponding to this factor.

When the initial value of the evaluation criterion in the target area shows that this area tends to be difficult to travel through, the evaluation criterion setting unit 240 checks the presence/absence of the travel assist factors A2$a$ corresponding to this area, but does not check the presence/absence of the travel inhibiting factors A1$a$ corresponding to this area. This is because, the impression of the driver that this area is difficult to travel through is not changed by an additional decrease in the evaluation criterion when the target area inherently tends to be difficult to travel through, and such correction of the evaluation criterion would not be that useful for the driver of the vehicle.

For example, in the example depicted in FIG. 4, the initial value "4" of the evaluation criterion in a site P1 indicates that the site P1 tends to be difficult to travel through. Therefore, only the presence/absence of the travel assist factors A2$a$ corresponding to the site P1 is checked. In this example, since the "SHOULDERS" and "DROP-OFF AND PICK-UP LOCATIONS" are included as the travel assist factors A2$a$ corresponding to the site P1, a correction value "7" of the evaluation criterion in the site P1 is calculated by correcting the initial value "4" of the evaluation criterion by using the correction amounts "+1" and "+2" corresponding to those factors.

Thus, when the travel inhibiting factors A1$a$ are included in the target area, the initial value of the evaluation criterion is corrected downward. When the travel assist factors A2$a$ are included in the target area, the initial value of the evaluation criterion is corrected upward.

Further, as depicted in FIG. 1, in the statistical database 220, driving characteristics for each predetermined area which have been acquired by the plurality of vehicles 100 through the onboard control devices during the running of the vehicles are collected through the center communication unit 201, and the collected driving characteristics are stored in the driving characteristic storage unit 222. The driving characteristics stored in the driving characteristic storage unit 222 are classified into first driving characteristics D1 calculated for each predetermined area without taking into account the size of the effect produced by the disturbance factors B1a when the characteristics are acquired and second driving characteristics D2 calculated for each predetermined area by extracting only information at the time of a small effect produced by the disturbance factors B1a when the characteristics are acquired.

The management center 200 corrects the correction value of the evaluation criterion through the evaluation criterion setting unit 240 by using the driving characteristics D1, D2 for each predetermined area which have been stored in the driving characteristic storage unit 222 of the statistical database 220.

More specifically, the evaluation criterion setting unit 240 recalculates the driving characteristics D1, D2 for each predetermined area into an index value of the ease of travel. In the embodiment, as depicted in FIG. 5, the ease of travel in each area is then classified into five ranks "A" to "E" on the basis of the index value E recalculated from the driving characteristics D1, D2 for each area. In this case, too, when the ease of travel in the areas has the rank "A" or "B", this area tends to be easy to travel through. When the ease of travel in the areas has the rank "C" to "E", this area tends to be difficult to travel through.

In the embodiment, as depicted in FIG. 6, the driving characteristics D1, D2 are evaluated on the basis of the following three items: "FREQUENCY OF ACCELERATION OPERATION", "FREQUENCY OF BRAKE OPERATION", and "FREQUENCY OF STEERING OPERATION". The frequency of each item is classified into three stages: "LARGE", "MEDIUM", and "SMALL", and an index value E of "1", "2", or "3" is added to each of the classifications. The degree of effect of the disturbance factors B1a at the time of acquisition thereof is set in association with the index values E of those driving characteristics.

In the example depicted as "DATA 1" in FIG. 6, the "FREQUENCY OF ACCELERATION OPERATION", "FREQUENCY OF BRAKE OPERATION", and "FREQUENCY OF STEERING OPERATION" are all "SMALL" as the driving characteristics in site P1. Therefore, "9" is calculated as the index value E of the ease of travel. This result indicates that the site P1 tends to be easy to travel through. Further, "DATA 1" are data corresponding to the second driving characteristics D2 at the side P1, those data being acquired when the effect of the disturbance factors B1a at the time the driving characteristics are acquired is small.

Meanwhile, in the example depicted as "DATA 4" in FIG. 6, the "FREQUENCY OF ACCELERATION OPERATION", "FREQUENCY OF BRAKE OPERATION", and "FREQUENCY OF STEERING OPERATION" are "SMALL", "MEDIUM", and "MEDIUM", respectively, also as the driving characteristics in site P1. Therefore, "7" is calculated as the index value E of the ease of travel. This result indicates that the site P1 tends to be difficult to travel through. Further, "DATA 4" are data obtained when the effect of the disturbance factors B1a at the time the driving characteristics are acquired is large.

In the example depicted as "DATA 7" in FIG. 6, the index value E of the ease of travel is the index value E of "8", which is an average of the index value E of "9" in "DATA 1" and the index value E of "7" in "DATA 4". This average index value E represents data corresponding to the first driving characteristics D1 at the side P1 and is a value calculated without taking into account the size of the effect produced by the disturbance factors B1a at the time the driving characteristics are acquired.

When the degree of separation between the tendency of the ease of travel which is based on the evaluation criterion in the target area and the tendency of the ease of travel which is based on the driving characteristics in the same area is equal to or greater than a predetermined value, the evaluation criterion setting unit 240 corrects the evaluation criterion such as to reduce the separation. This is done so because the driving characteristics in a certain area strongly reflect the actual state of the ease of travel when the vehicle 100 travels in this area, and therefore when the aforementioned separation is present, the tendency of the ease of travel which is based on the evaluation criterion does not reflect the actual state.

For example, the site P1 depicted in FIG. 4 tends to be difficult to travel through when the determination is based on the evaluation criterion, but the site P1 depicted as "DATA 7" in FIG. 6 tends to be easy to travel through when the determination is based on the driving characteristics, and a large separation is present therebetween. In such a case, the evaluation criterion setting unit 240 determines that the degree of separation thereof is equal to or greater than the predetermined value and reduces the degree of separation by correcting upward the evaluation criterion "7" in the site P1.

Further, in the embodiment, when the evaluation criterion in the target area shows a tendency toward a difficult travel, the evaluation criterion setting unit 240 determines the degree of separation by using the tendency of the ease of travel which is based on the first driving characteristics D1 corresponding to this area. This is done so because when a certain area tends to be difficult to travel through, the ease of travel through the area is hardly affected by the disturbance factors B1a, and therefore it is hardly necessary to take into account also the disturbance factors B1a at the time the driving characteristics corresponding to this area are acquired.

Likewise, for example, the site P2 depicted in FIG. 4 tends to be easy to travel through when the determination is based on the evaluation criterion, but the site P2 depicted as "DATA 2" in FIG. 6 tends to be difficult to travel through when the determination is based on the driving characteristics, and a large separation is present therebetween. In such a case, the evaluation criterion setting unit 240 determines that the degree of separation thereof is equal to or greater than the predetermined value and reduces the degree of separation by correcting downward the evaluation criterion "10" in the site P2.

Further, in the embodiment, when the evaluation criterion in the target area shows a tendency toward an easy travel, the evaluation criterion setting unit 240 determines the degree of separation by using the tendency of the ease of travel which is based on the second driving characteristics D2 corresponding to this area. This is done so because when a certain area tends to be easy to travel through, the ease of travel through the area is easily affected by the disturbance factors B1a, and therefore it is highly necessary to determine the driving characteristics that strongly reflect the actual state, by extracting the driving characteristics acquired when the effect of the disturbance factors B1a is small, from among the driving characteristics corresponding to this area.

Further, the management center 200 calculates the evaluation relating to ease of travel through each area for each vehicle 100 by using the disturbance information Ba for each predetermined area that has been stored in the disturbance information storage unit 211 of the vehicle database 210 and subtracting, through the evaluation calculation unit 241, the evaluation criterion corrected by the evaluation criterion setting unit 240.

More specifically, the evaluation calculation unit 241 has a subtraction value table T which is referred to when the evaluation criterion is subtracted. As depicted in FIG. 7, the correction amount corresponding to each disturbance factor B1a that degrade the ease of travel on the road, such as pedestrians, bicycles, regular vehicles, large vehicles, street parking, bicycle parking, and fallen objects, in the target area have been determined in advance in the subtraction value table T.

In the subtraction value table T, the correction amount finely divided for each positional relationship B2a between the disturbance factor B1a and the vehicle 100 is also determined, and the correction amount is larger when the positional relationship B2a between the disturbance factor B1a and the vehicle 100 indicates a comparative proximity thereof. This is because when the positional relationship B2a between the disturbance factor B1a and the vehicle 100 indicates a comparative proximity thereof, it can be assumed that the effect produced by the disturbance factor B1a on the ease of travel of the vehicle 100 increases. In the example depicted in FIG. 7, the positional relationship B2a between the disturbance factor B1a and the vehicle 100 is classified into two classes, namely, "SHORT" and "LONG", and different correction amounts are determined for each stage. In this case, a class to which the positional relationship B2a between the disturbance factor B1a and the vehicle 100 belongs is determined, for example, on the basis of whether or not the distance between the vehicle 100 and the disturbance factor B1a at the time the disturbance information is acquired is equal to or greater than a predetermined value. For example, when the disturbance factor B1a is a traveling vehicle such as a regular vehicle or large vehicle, a class to which the positional relationship B2a between the disturbance factor B1a and the vehicle 100 belongs may be determined, for example, on the basis of the positional relationship between the lane of travel of the traveling vehicle and the lane of travel of the vehicle 100.

Further, in the subtraction value table T, when those disturbance factors B1a are associated with the exceptional vehicle state B3a, a correction amount is determined which corresponds to each combination of the disturbance factors B1a and the exceptional vehicle state B3a. In the example depicted in FIG. 7, the disturbance factor B1a of "PEDESTRIAN" is associated with the exceptional vehicle state B3a of "DARK ROAD". This is done so because when a pedestrian is present around the vehicle, the ease of travel on the road is degraded, but when the vehicle 100 travels on a dark road, the presence of a pedestrian around the vehicle can be assumed to degrade the ease of travel on the road more significantly. Further, in the example depicted in FIG. 7, the disturbance factor B1a of "REGULAR VEHICLE" is associated with the exceptional vehicle state B3a of "DARK ROAD". This is done so because usually when a regular vehicle is present around the vehicle 100, the ease of travel on the road is degraded, but when the vehicle 100 travels on a dark road, a regular vehicle present around the vehicle 100 can be assumed to improve the field of view of the vehicle 100 and rather improve the ease of travel on the road. Thus, when the disturbance factor B1a of "REGULAR VEHICLE" improves the ease of travel on the road in combination with the vehicle state B3a of "DARK ROAD", the evaluation criterion is added in response to the disturbance factor B1a. As a result, the evaluation relating to ease of travel in each area is corrected to be higher than that in the usual vehicle state B3a.

In the embodiment, the evaluation calculation unit 241 is configured to use a common subtraction value table T regardless of the evaluation relating to ease of travel in each area. Further, as mentioned hereinabove, in the embodiment, since the subtraction value table T is used, as a rule, by assuming that the disturbance factors B1a degrade the ease of travel on the road, the evaluation calculation unit 241 is configured to subtract the evaluation criterion corrected by the evaluation criterion setting unit 240 in response to the disturbance factors B1a.

Therefore, the evaluation criterion corrected by the evaluation criterion setting unit 240 becomes the upper limit value of the evaluation relating to ease of travel on a road when the disturbance factors B1a are not taken into account. Thus, the evaluation relating to ease of travel does not change in response to the disturbance factors B1a before a range exceeding the correction value of the evaluation criterion, and the variation width of the evaluation is restricted to a range of values equal or lower than the evaluation criterion.

For example, in the example depicted in FIG. 8, mutually different correction values of the evaluation criterion are set for areas PA, PB, PC, and the variation widths S1, S2, S3 thereof differ from each other. Further, in this example, the evaluation calculation unit 241 calculates the evaluation relating to ease of travel by executing the correction calculation of the evaluation criterion by taking into account the disturbance factors B1a present when the vehicle travels through the area PB only with respect to the area PB in which the variation width of the correction value of the evaluation criterion is equal to or greater than a predetermined value. This is done so because when the variation of evaluation relating to ease of travel in a certain area is small, the impression of the driver of the vehicle 100 relating to ease of travel in the same area practically does not change, and therefore even when the evaluation relating to ease of travel is subtracted according to the disturbance factors B1a, it would not be useful for the driver of the vehicle 100.

When the evaluation calculation unit 241 calculates the evaluation relating to ease of travel, the calculation result is stored in the evaluation storage unit 242 in vehicle units in association with the vehicle ID of the vehicle 100. Further, the evaluation calculation unit 241 sets a life for the calculated evaluation relating to ease of travel and stores the set life in the evaluation storage unit 242 in vehicle units in association with the evaluation relating to ease of travel. In this case, the evaluation calculation unit 241 updates the evaluation relating to ease of travel according to the set life, and when the evaluation relating to ease of travel indicates a tendency toward a difficult travel, sets the life of this evaluation to the usual length, but when the evaluation relating to ease of travel indicates a tendency toward an easy travel, sets the life of the evaluation to be shorter than usual. This is done so because, if the ease of travel in this area changes when a certain area tends to be easy to travel through, the impression of the driver of the vehicle 100 relating to ease of travel in this area changes greatly, and therefore with respect to the evaluation of ease of travel in such an area, an update suited to the actual circumstances of each case is particularly needed.

Further, the management center 200 reads the evaluation relating to ease of travel which corresponds to the vehicle 100 from the evaluation storage unit 242 and feeds back the evaluation relating to ease of travel, which has been read, to each corresponding vehicle 100 through the center communication unit 201. Further, the navigation control device 110 of the vehicle 100 stores in the evaluation storage unit 113 the evaluation relating to ease of travel which has been fed back from the management center 200 through the onboard communication unit 120.

Figure 9:
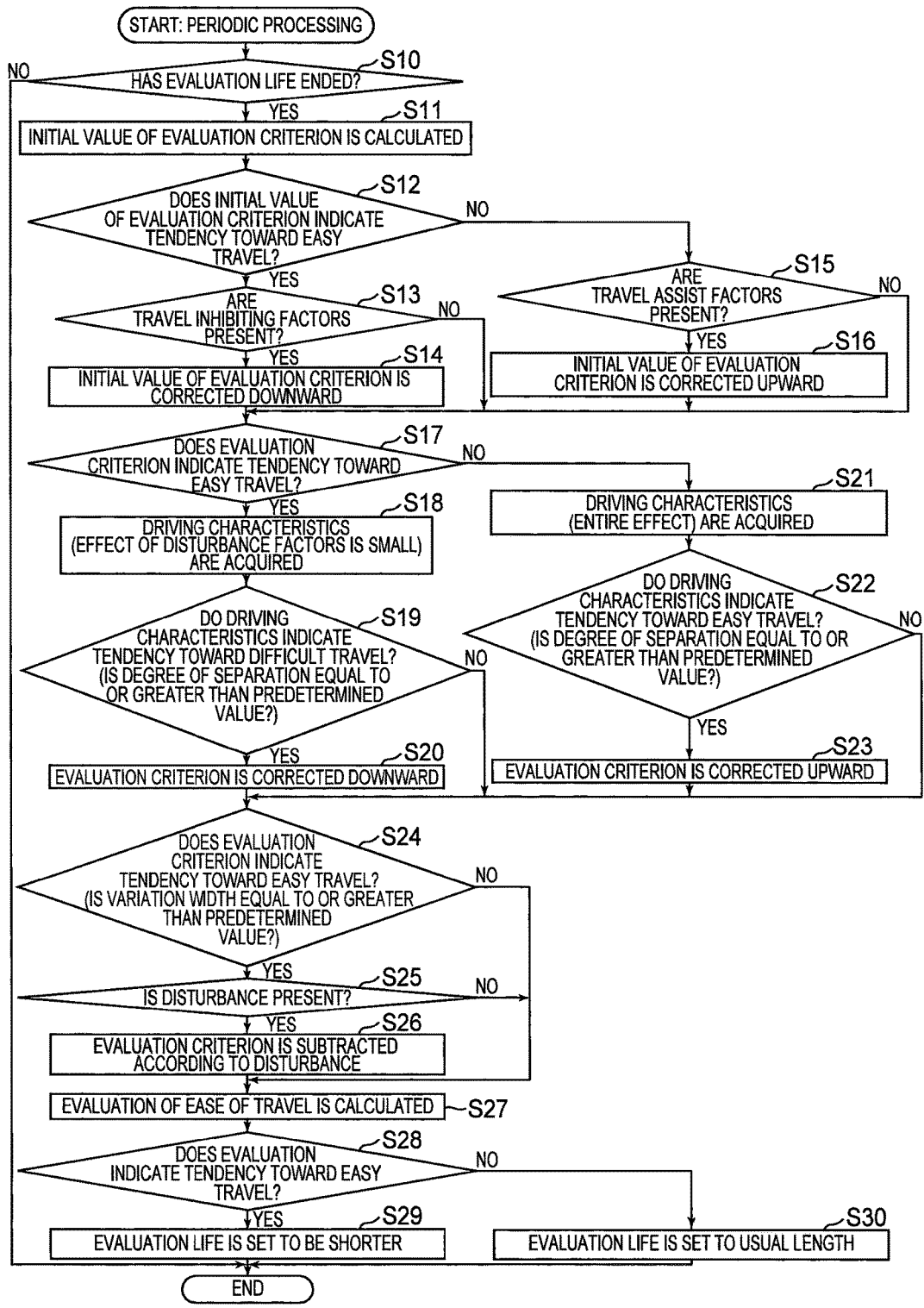
FIG. 9 is a flowchart illustrating the processing sequence of evaluation processing executed when the vehicular drive assist system of the first embodiment calculates the evaluation relating to ease of travel on a road.

A specific processing sequence is explained hereinbelow with respect to the evaluation processing relating to ease of travel on a road which is executed by the management center 200 of the embodiment. As depicted in FIG. 9, the management center 200 monitors, with a period common to all of the areas, whether or not to update the evaluation relating to ease of travel on a road, and periodically acquires the evaluation relating to ease of travel from the evaluation storage unit 242. A life of evaluation for each area is set in association with the acquired evaluation relating to ease of travel. Then, when the life of the evaluation relating to ease of travel has ended, it is assumed that a certain interval of time has elapsed since the ease of travel in the target area has been evaluated and that the reliability of the evaluation has decreased.

Accordingly, when the life of the evaluation relating to ease of travel in a certain area has ended (step S10), the management center 200 calculates through the evaluation criterion setting unit 240 the initial value of the evaluation criterion of the target area by using road information C, which is stored in the map information database 230, with the object of updating the evaluation relating to ease of travel for the area in which the life of evaluation has ended as the target area (step S11).

Then, the management center 200 determines through the evaluation criterion setting unit 240 whether or not the calculated initial value of evaluation criterion shows a tendency toward an easy travel (step S12). When a tendency toward an easy travel is shown (step S12=YES), it is determined whether or not the travel inhibiting factor A1$a$ is included as the road information Aa corresponding to the target area in the road information storage unit 221 of the statistical database 220 (step S13). As a result, when the travel inhibiting factor A1$a$ is included as the road information Aa corresponding to the target area (step S13=YES), the initial value of the evaluation criterion is corrected downward by a correction amount which has been set correspondingly to this travel inhibiting factor A1$a$ (step S14), and the processing flow then advances to step S17. Meanwhile, when the travel inhibiting factor A1$a$ is not included as the road information Aa corresponding to the target area (step S13=NO), the processing flow advances to step S17, without correcting the initial value of the evaluation criterion.

When the initial value of the evaluation criterion of the target area shows a tendency toward a difficult travel (step S12=NO), the management center 200 determines whether or not the travel assist factor. A2$a$ is included as the road information Aa corresponding to the target area in the road information storage unit 221 of the statistical database 220 (step S15). When the travel assist factor A2$a$ is included as the road information Aa corresponding to the target area (step S15=YES), the initial value of the evaluation criterion is corrected upward by a correction amount which has been set correspondingly to this travel assist factor A2$a$ (step S16), and the processing flow then advances to step S17. Meanwhile, when the travel assist factor A2$a$ is not included as the road information Aa corresponding to the target area (step S15=NO), the processing flow advances to step S17, without correcting the initial value of the evaluation criterion.

Then, the management center 200 determines through the evaluation criterion setting unit 240 whether or not the evaluation criterion which has been corrected, as appropriate, according to the road information Aa indicates a tendency toward an easy travel (step S17). When a tendency toward an easy travel is indicated (step S17=YES), the second driving characteristic D2, which has been calculated by extracting only the information obtained when the effect of the disturbance factors B1$a$ at the time of acquisition of the driving characteristics was small, is read out as the driving characteristic corresponding to the target area from the driving characteristic storage unit 222 of the statistical database 220 to the evaluation criterion setting unit 240 (step S18). Then, the management center 200 determines through the evaluation criterion setting unit 240 whether or not the tendency of an ease of travel which is based on the second driving characteristic D2, which has been read out, is a tendency toward a difficult travel (step S19). As a result, when the tendency of an ease of travel which is based on the second driving characteristic D2 is a tendency toward a difficult travel (step S19=YES), the degree of separation between the tendency of ease of travel which is based on the evaluation criterion in the target area and the tendency of ease of travel which is based on the driving characteristic in the same area is equal to or greater than a predetermined value, and therefore the evaluation criterion is corrected downward (step S20), and the processing flow then advances to step S24. Meanwhile, when the tendency of an ease of travel which is based on the second driving characteristic D2 is a tendency toward an easy travel (step S19=NO), the degree of separation between the tendency of ease of travel which is based on the evaluation criterion in the target area and the tendency of ease of travel which is based on the driving characteristic in the same area is less than a predetermined value, and therefore the processing flow then advances to step S24 without correcting the evaluation criterion.

Further, when the evaluation criterion which has been corrected, as appropriate, according to the road information Aa indicates a tendency toward a difficult travel (step S17=NO), the management center 200 reads the first driving characteristic D1, which has been calculated without taking into account the size of the effect of the disturbance factors B1$a$ at the time of acquisition of the driving characteristics, as the driving characteristic corresponding to the target area from the driving characteristic storage unit 222 of the statistical database 220 to the evaluation criterion setting unit 240. Then, the management center 200 determines through the evaluation criterion setting unit 240 whether or not the tendency of an ease of travel which is based on the first driving characteristic D1, which has been read out, is a tendency toward an easy travel (step S22). As a result, when the tendency of an ease of travel which is based on the first driving characteristic D1 is a tendency toward an easy travel (step S22=YES), the degree of separation between the tendency of ease of travel which is based on the evaluation criterion in the target area and the tendency of ease of travel which is based on the driving characteristic in the same area is equal to or greater than a predetermined value, and therefore the evaluation criterion is corrected upward (step S23), and the processing flow then advances to step S24. Meanwhile, when the tendency of an ease of travel which is based on the first driving characteristic D1 is a tendency toward a difficult travel (step S22=NO), the degree of separation with the tendency of ease of travel which is based on the driving characteristics in the target area is less than a predetermined value, and therefore the processing flow then advances to step S24 without correcting the evaluation criterion.

Then, the management center 200 determines through the evaluation calculation unit 241 whether or not the evaluation criterion which has been corrected, as appropriate, according to the road information Aa or the driving characteristics D1, D2 indicates a tendency toward an easy travel (step S24). When a tendency toward an easy travel is indicated (step S24=YES), it is determined in vehicle units whether or not the disturbance information Ba corresponding to the target area is included in the disturbance information storage unit 211 of the vehicle database 210 (step S25). As a result, when the disturbance information Ba corresponding to the target area is included (step S25=YES), a correction amount which has been set in the subtraction value table T correspondingly to the disturbance information Ba is subtracted from the evaluation criterion and the evaluation criterion obtained by such subtraction is calculated as the evaluation relating to ease of travel in the same area for each vehicle (step S27). Meanwhile, when the disturbance information Ba corresponding to the target area is not included (step S25=NO), the evaluation criterion is calculated as the evaluation relating to ease of travel in the same area for each vehicle, without subtracting the evaluation criterion (step S27). Further, when the evaluation criterion which has been corrected, as appropriate, according to the road information Aa or driving characteristic D1, D2 indicates a tendency toward a difficult travel (step S24=NO), the evaluation criterion is also calculated as the evaluation relating to ease of travel in the same area for each vehicle, without subtracting the evaluation criterion (step S27).

Then, the management center 200 determines through the evaluation calculation unit 241 whether or not the evaluation relating to ease of travel in a target area indicates a tendency toward an easy travel (step S28). When a tendency toward an easy travel is indicated (step S28=YES), the life of the evaluation relating to ease of travel is set to be shorter than usual (step S29). Meanwhile, when the evaluation relating to ease of travel in a target area indicates a tendency toward a difficult travel (step S28=NO), the life of the evaluation relating to ease of travel is set to a usual length (step S30). Then, the management center 200 stores the evaluation relating to ease of travel in a target area from the evaluation calculation unit 241 in the evaluation storage unit 242 in association with the corresponding life information and vehicle information, and then ends the processing of updating the evaluation relating to ease of travel on a road.

The operation of the vehicular drive assist system of the embodiment is explained hereinbelow, the explanation being mainly focused on the operations performed when the ease of travel on the road corresponding to each vehicle 100 is evaluated. In the explanation below, the exchange of information between the management center 200 and the vehicle 100 is performed by taking the management center 200 side as a main device (master).

Figure 10:
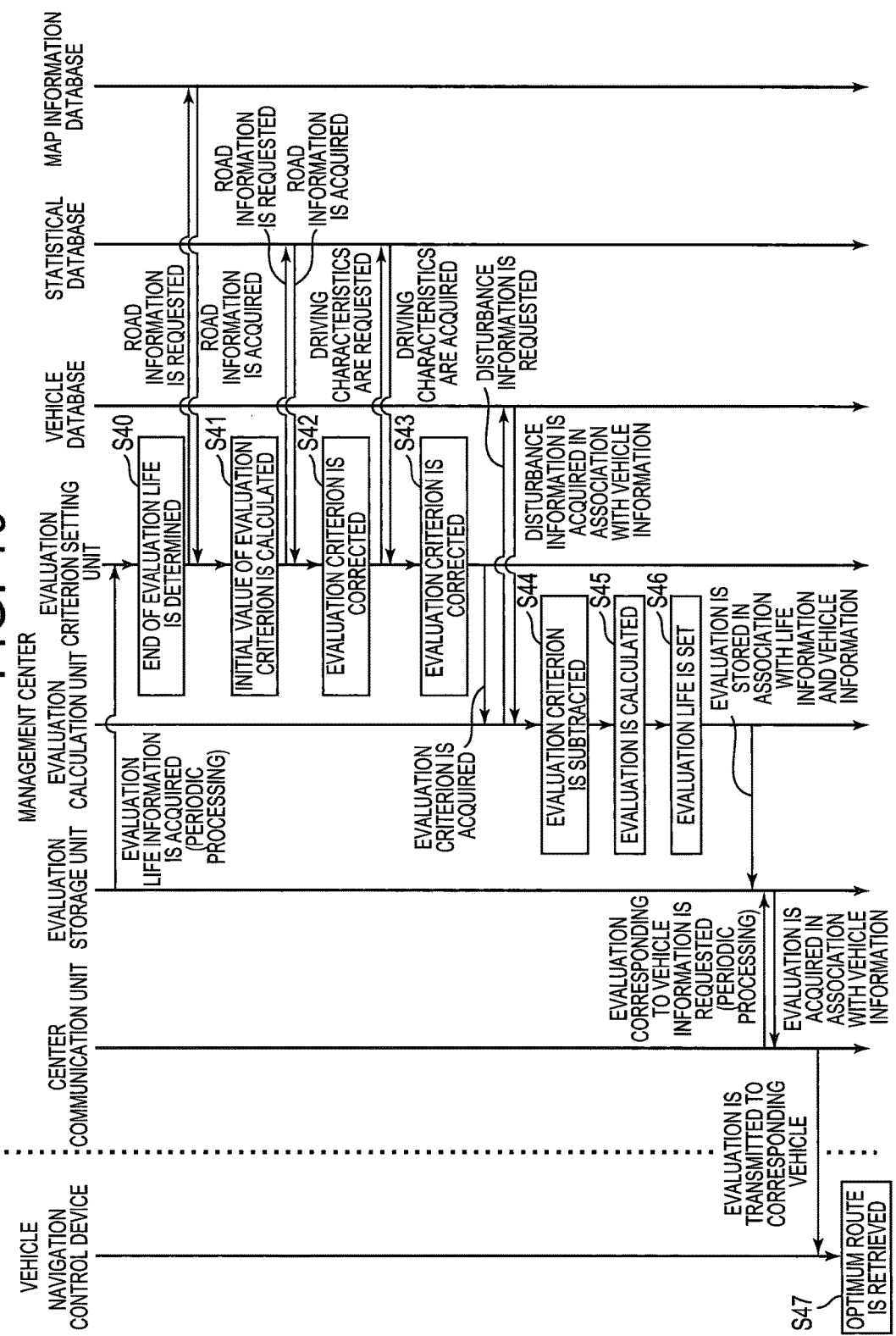
FIG. 10 is a sequence chart illustrating the flow of information when the vehicular drive assist system of the first embodiment executes the drive assist processing.

As depicted in FIG. 10, the evaluation criterion setting unit 240 periodically acquires life information on the evaluation relating to ease of travel in each predetermined area from the evaluation storage unit 242. In this case, the evaluation criterion setting unit 240 triggered by the determination that the evaluation life thus acquired has ended (step S40) accesses the map information database 230 and acquires the road information C corresponding to the area which has been the determination object from the map information database 230. Then, the evaluation criterion setting unit 240 calculates the initial value of the evaluation criterion of the corresponding area on the basis of the road information C which has thus been acquired (step S41).

The evaluation criterion setting unit 240 then accesses the statistical database 220 and acquires the road information Aa corresponding to the same area from the statistical database 220. The evaluation criterion setting unit 240 then corrects the evaluation criterion of the corresponding area on the basis of the road information Aa that has thus been acquired (step S42).

The evaluation criterion setting unit 240 then accesses the statistical database 220 and acquires the driving characteristics D1, D2 corresponding to the same area from the statistical database 220. The evaluation criterion setting unit 240 then further corrects the evaluation criterion of the corresponding area on the basis of the driving characteristics D1, D2 that have thus been acquired (step S43).

Then, the evaluation calculation unit 241 triggered by the acquisition of the evaluation criterion of the corresponding area from the evaluation criterion setting unit 240 accesses the vehicle database 210 and acquires the disturbance information Ba corresponding to the same area in association with the vehicle information. The evaluation calculation unit 241 then subtracts the evaluation criterion of the corresponding area according to the disturbance information Ba (step S44) and calculates the subtracted evaluation criterion as an evaluation relating to ease of travel in the same area (step S45).

Then, the evaluation calculation unit 241 sets the life of evaluation according to the evaluation relating to ease of travel in the corresponding area (step S46) and stores the evaluation relating to ease of travel in the same area in the evaluation storage unit 242 in association with the life information and vehicle information. The center communication unit 201 periodically accesses the evaluation storage unit 242 and acquires the evaluation relating to ease of travel which has been associated with the vehicle information of the transmission destination. The center communication unit 201 also feeds back the evaluation relating to ease of travel which has thus been acquired to the corresponding vehicle 100. When the evaluation relating to ease of travel is fed back from the center communication unit 201, the navigation control device 110 of the vehicle 100 retrieves the optimum route of travel intervals of the vehicle 100 while referring to the evaluation relating to ease of travel which has been fed back (step S47).

With the first embodiment described hereinabove, the following effects can be obtained. (1) As depicted in FIG. 8, the evaluation criterion based on static factors of road environment of each area is taken as an upper limit value, and the variation width of the evaluation relating to ease of travel is restricted to a range equal to or below the evaluation criterion. Therefore, the occurrence of a significant shift in evaluation such that the set upper limit value is exceeded, at least under the effect of disturbance, can be suppressed. Thus, the evaluation relating to ease of travel which is more suitable in terms of performing the drive assist can be fed back.

(2) As also depicted in FIG. 8, since the variation width of the evaluation relating to ease of travel is restricted to a range equal to or less than the evaluation criterion, the range for acquiring the evaluation relating to ease of travel is constrained, and therefore the evaluation data length can be reduced. As a result, the processing load required to calculate the evaluation relating to ease of travel is decreased and the volume of data saved in the course of processing is suppressed.

(3) The evaluation criterion is set for each area by using not only the road information C included in the map information database 230, but also the road information Aa which is not included in the map information database 230. Therefore, the reliability of general usage of the evaluation criterion for a large number of vehicles is increased.

(4) The road information Aa which is not included in the map information database 230 is classified into travel inhibiting factors A1a and travel assist factors A2a. Therefore, the evaluation criterion based on the static factors of road environment is corrected in a mode suitable for each classified group of factor.

(5) When a certain area inherently tends to be easy to travel through, downward correction based on the travel inhibiting factors A1a is selectively performed without performing the upward correction based on the travel assist factors A2a in this area. Further, when a certain area inherently tends to be difficult to travel through, upward correction based on the travel assist factors A2a is selectively performed without performing the downward correction based on the travel inhibiting factors A1a in this area. Thus, the factors used for correcting the evaluation criterion based on the static factors of road environment are restricted according to ease of travel in each area. Therefore, the unnecessary increase in the processing load on the entire system which is required to correct the evaluation criterion based on the static factors of road environment is suppressed.

(6) The road information Aa which is not included in the map information database 230 is acquired through the onboard camera 140 during the running of the vehicle 100. Therefore, the road information Aa on the area through which the vehicle 100 frequently travels is updated to the newest information with a comparatively high frequency. As a result, when the road information Aa on the area changes within a certain period, the reliability of general usage of the evaluation criterion based on static factors of road environment in the same area for a large number of vehicles is increased.

(7) Since the evaluation relating to ease of travel in each area is corrected by taking into account individually the disturbance factors B1a acting upon each vehicle, the drive assist corresponding to the actual state of individual vehicles can be easily performed for each area on the basis of such an evaluation. Further, in this case, as descried hereinabove, the correction amount of evaluation relating to ease of travel, which corresponds to the disturbance factors B1a, is fit in a range equal to or below the evaluation criterion, the evaluation criterion based on static factors of road environment for each area being taken as an upper limit value.

(8) A value corresponding to each disturbance factor B1a is selected for the correction amount of the evaluation criterion corresponding to the disturbance factors B1a. Therefore, the correction calculation of the evaluation criterion is performed while taking into account individually the effects produced by individual disturbance factors B1a on the ease of travel on the road. As a result, the evaluation relating to ease of travel which better reflects the actual state of individual vehicles is obtained.

(9) When the disturbance factors B1a are located around a vehicle, a value corresponding to each positional relationship B2a between the disturbance factors B1a and the vehicle 100 is selected as the correction amount of the evaluation criterion corresponding to the disturbance factors B1a. Therefore, since the evaluation relating to ease of travel is corrected while taking into account the effects produced on the ease of travel on the road for each positional relationship B2a between the disturbance factors B1a located around the vehicle and the vehicle 100, the evaluation which better reflects the actual state of individual vehicles is obtained.

(10) When the disturbance factors B1a and the state B3a of the vehicle are associated with each other, a value corresponding to each combination of the associated disturbance factors B1a and the vehicle state B3a is selected as the correction amount of the evaluation criterion corresponding to the disturbance factors B1a. Therefore, when a certain disturbance factor B1a produces a special effect on the ease of travel on the road for the vehicle state B3a, the correction calculation of the evaluation criterion is performed by taking into account this vehicle state B3a. Therefore, the evaluation which better reflects the actual state of individual vehicles is obtained.

(11) When a certain disturbance factor B1a assists the ease of travel on the road for the vehicle state B3a, the evaluation calculation unit 241 performs correction calculation to increase the evaluation criterion according to the disturbance factor B1a. Therefore, the evaluation criterion relating to ease of travel which better reflects the actual state of individual vehicles is obtained.

(12) The correction that takes into account the disturbance factors B1a at the time the vehicle 100 travels through an area is executed only when the variation width from the evaluation criterion relating to ease of travel is equal to or greater than a predetermined value in the area. As a result, the unnecessary increase in the processing load on the entire system which is required to correct the evaluation criterion corresponding to the disturbance factors B1a is suppressed.

(13) When a degree of separation of a tendency of ease of travel which is based on the evaluation criterion for a certain specific area and a tendency of ease of travel which is based on driving characteristics D1, D2 of the vehicle corresponding to the same area is equal to or greater than a predetermined value, the evaluation criterion relating for the same area is corrected such that the degree of separation is decreased. Thus, the driving characteristics D1, D2 of the vehicle which strongly reflect the actual state of ease of travel when the vehicle travels through a certain area are taken into account, and the evaluation criterion which has been calculated on the basis of information relating to static factors of road environment in each area is corrected as necessary. Therefore, since the evaluation criterion is in line with the actual state to a greater degree, the reliability of general usage of such evaluation criterion which is based on static factors of road environment with respect to a large number of vehicles is further increased.

(14) The evaluation criterion setting unit 240 determines the degree of separation with respect to a tendency of ease of travel which is based on the second driving characteristics D2 acquired when the disturbance factors of the vehicle are comparatively small, from among the driving characteristics D1, D2 of the vehicle corresponding to a predetermined area, and a tendency of ease of travel which is based on the evaluation criterion for the same area, on condition that the criterion for this area shows a tendency toward an easy travel. Therefore, the driving characteristics that stronger reflect the ease of travel for each area can be extracted, and the evaluation criterion can be better brought in line with the actual state. Further, since a case in which the driving characteristics are extracted by taking into account the presence/absence of the disturbance factors B1a is restricted with consideration for the necessity thereof, this is one more reason why the unnecessary increase in the processing load on the entire system which is required to extract the driving tendency is suppressed.

(15) When a certain area tends to be easy to travel through, the life of the evaluation criterion relating to ease of travel is set shorter than usual. As a result, the evaluation criterion relating to ease of travel is prevented from deviating from the actual state.

(16) The road information Aa which is versatile information for most vehicles and the disturbance information Ba which is information suitable individually to each vehicle are managed integrally by the management center 200. On the basis of those types of information, the management center 200 performs correction calculation of the evaluation criterion relating to ease of travel in each area for each vehicle and performs wireless transmission of information on the corrected evaluation criterion to each corresponding vehicle. Therefore, although the processing load is concentrated on the management center 200, the correction calculation of the evaluation criterion for each vehicle can be stably performed by combining the types of information managed by the management center 200. Further, even when a vehicle in which drive assist is performed on the basis of the evaluation criterion relating to ease of travel on a road is added, the vehicle which is not provided with such an evaluation function may be added as a management object of the management center 200. As a result, flexibility and versatility of applying such a vehicle drive assist system to a plurality of vehicles are increased.

(17) The information on the driving characteristics for each predetermined area, which has been collected from a plurality of vehicles 100 in the management center 200, is stored as statistical information in the statistical database 220. Therefore, the erroneous effect based on the erroneous vehicle operation in each vehicle is reduced, thereby making it possible to obtain driving characteristics that better reflect the ease of travel in a certain area.

Second Embodiment

The second embodiment of the vehicular drive assist system will be explained hereinbelow with reference to the appended drawings. The second embodiment differs from the first embodiment in that information on the driving characteristics which has been collected from a plurality of vehicles in the management center is stored as information on each vehicle in the vehicle database. Therefore, in the explanation below, mainly the features that are different from those of the first embodiment are explained, and the redundant explanation of features which are the same as, or corresponding to those of the first embodiment is omitted.

Figure 11:
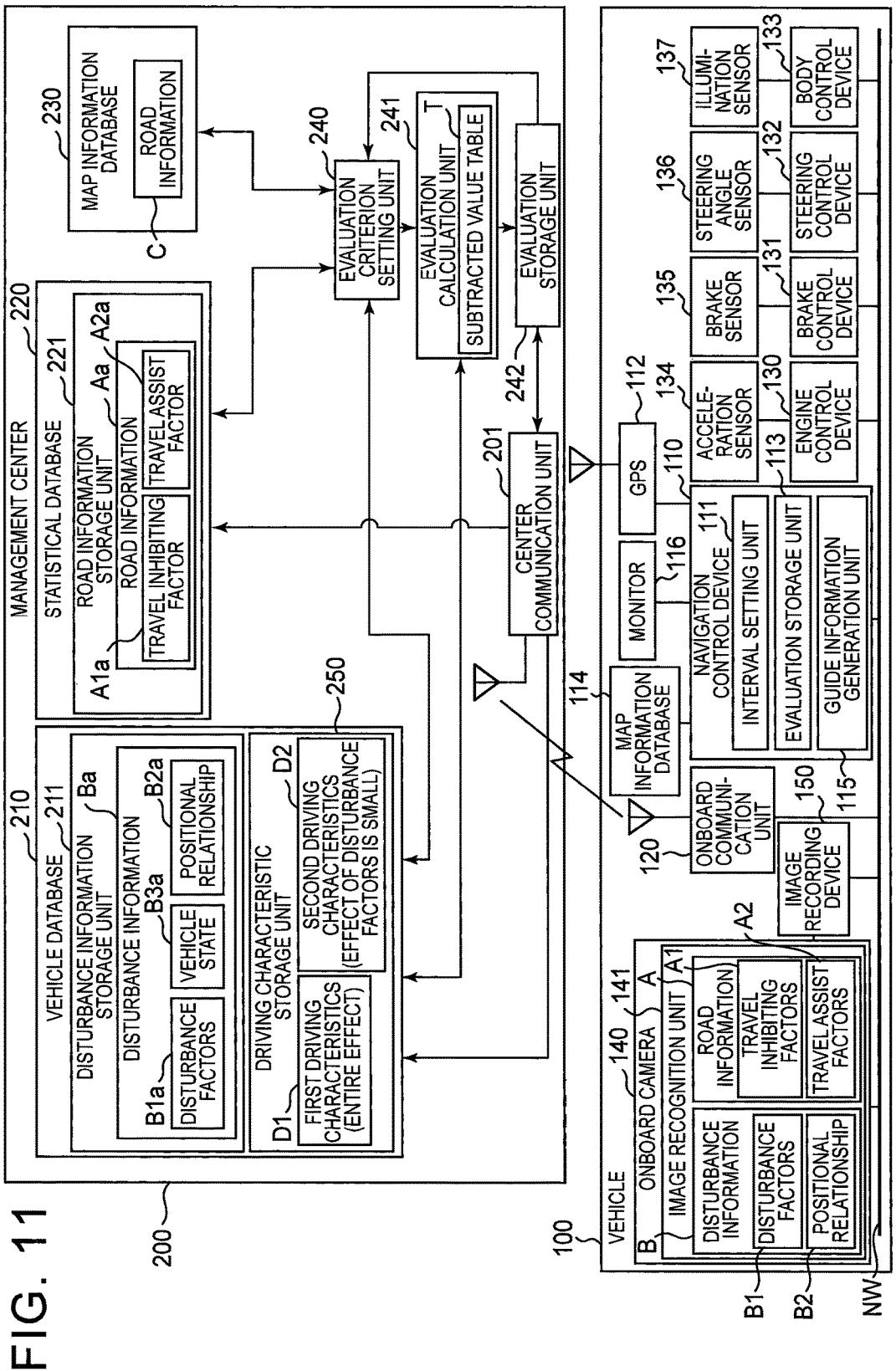
FIG. 11 is a block diagram illustrating the general configuration of the vehicle drive assist system of the second embodiment.

As depicted in FIG. 11, in the embodiment, the driving characteristics for each predetermined area which have been acquired through various onboard control devices for a plurality of vehicles 100 during the running of the vehicles are collected through the center communication unit 201 in the vehicle database 210, and the collected driving characteristics are stored in vehicle units in the driving characteristic storage unit 250. In this case, the driving characteristics which have been stored in the driving characteristic storage unit 250 are classified into first driving characteristics D1 which are calculated for each predetermined area without taking into account the size of the effect produced by the disturbance factors B1a at the time of acquisition of the driving characteristics and the second driving characteristics D2 calculated for each predetermined area by extracting only the information obtained when the effect produced by the disturbance factors B1a at the time of acquisition of the driving characteristics is small.

The evaluation criterion setting unit 240 uses the driving characteristics D1, D2 for each predetermined area, which have been stored in the driving characteristic storage unit 250 of the vehicle database 210, to determine for each vehicle the degree of separation between a tendency of an ease of travel which is based on the evaluation criterion in the target area and a tendency of an ease of travel which is based on the driving characteristics in the same area, and corrects, as appropriate, the evaluation criterion for each area according to the determination result.

Further, the evaluation calculation unit 241 calculates the evaluation relating to ease of travel in each area for each vehicle by acquiring the disturbance information Ba on the corresponding vehicle 100 from the disturbance information storage unit 211 of the vehicle database 210 and subtracting the evaluation criterion, which has been corrected by the evaluation criterion setting unit 240, by using the acquired disturbance information Ba.

Therefore, in the second embodiment, the following effect can be obtained instead of the effect of the first embodiment described in section (17) hereinabove. (17A) The information on driving characteristics for each area which have been collected from a plurality of vehicles 100 in the management center 200 is stored as information in vehicle units in the vehicle database 210. Therefore, the difference in driving characteristics between the drivers of individual vehicles is taken into account. As a result, the tendency of ease of travel which is based on the driving tendency is better reflected at the actual state of individual vehicles.

Third Embodiment

The third embodiment of the vehicular drive assist system will be explained hereinbelow with reference to the appended drawings. The third embodiment differs from the first or second embodiment in that when the evaluation relating to ease of travel on a road is updated, only the correction amount of the evaluation criterion corresponding to disturbance factors is updated, without updating the evaluation criterion. Therefore, in the explanation below, for the sake of convenience, mainly the features that are different from those of the first embodiment are explained, and the redundant explanation of features which are same or corresponding to those of the first embodiment is omitted.

In the embodiment, when updating the evaluation relating to ease of travel in a predetermined area, the management center 200 (FIG. 1) updates the correction amount of the evaluation criterion according to the disturbance information Ba on the corresponding area, but does not obtain the evaluation criterion itself for the same area. This is done so because the disturbance information Ba should be updated rapidly since it changes dynamically according to the time of acquisition thereof, whereas the evaluation criterion is defined on the basis of information relating to static factors of road environment and, therefore, does not necessarily require such rapid updating.

The update processing of the evaluation criterion is performed periodically and independently from the update processing of the evaluation relating to ease of travel. In this case, the update frequency of the evaluation criterion is set lower than that of the evaluation relating to ease of travel. As a result, usually, a common evaluation criterion is used when updating the evaluation relating to ease of travel.

Figure 12:
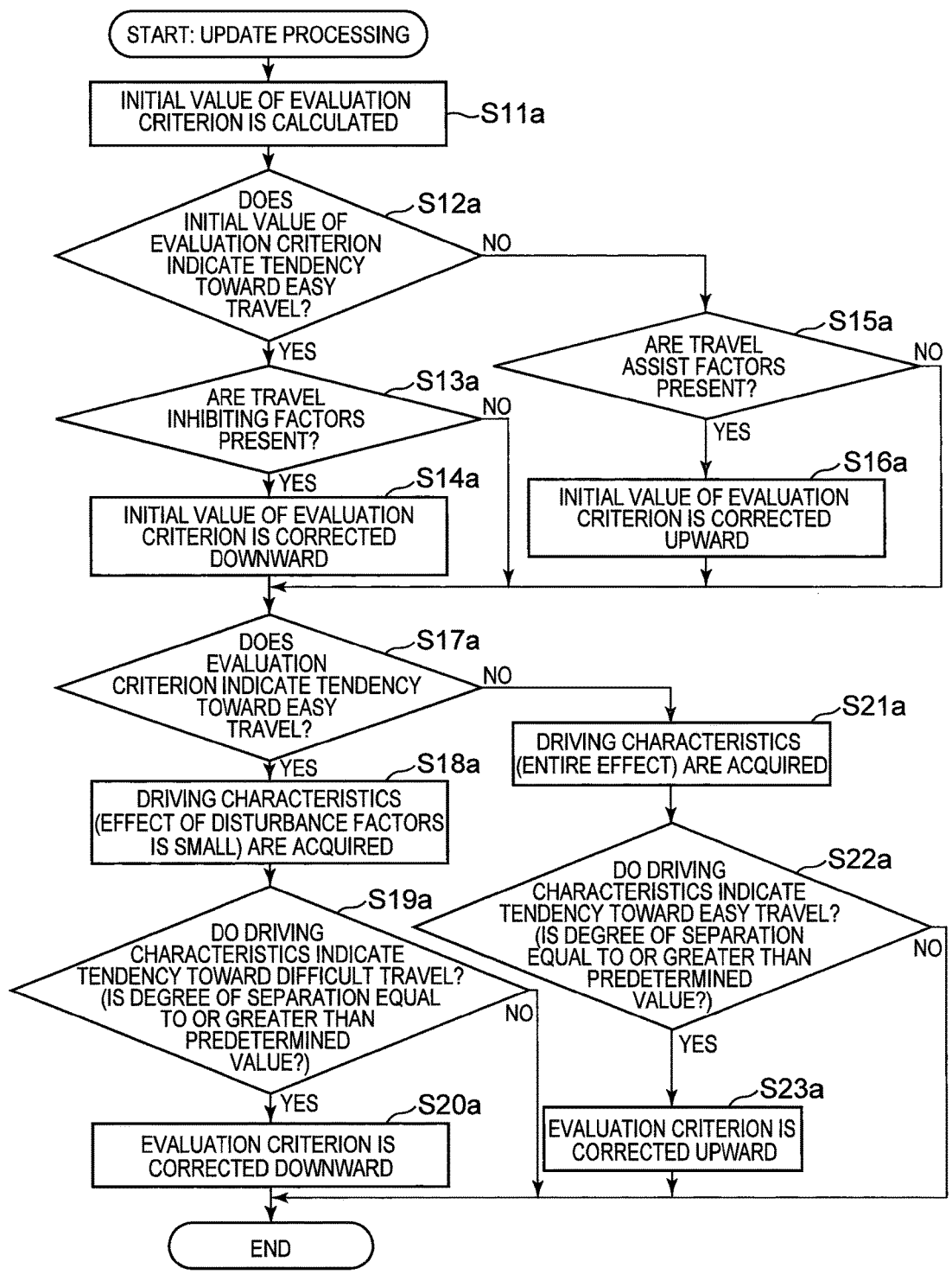
FIG. 12 is a flowchart illustrating the processing sequence of update processing executed by the vehicle drive assist system of the third embodiment when updating the evaluation criterion.

More specifically, as depicted in FIG. 12, in steps S11a to S23a, the management center 200 updates the evaluation criterion for each predetermined area in the same manner as in the processing of steps S11 to S23 (FIG. 9) in the first embodiment.

Figure 13:
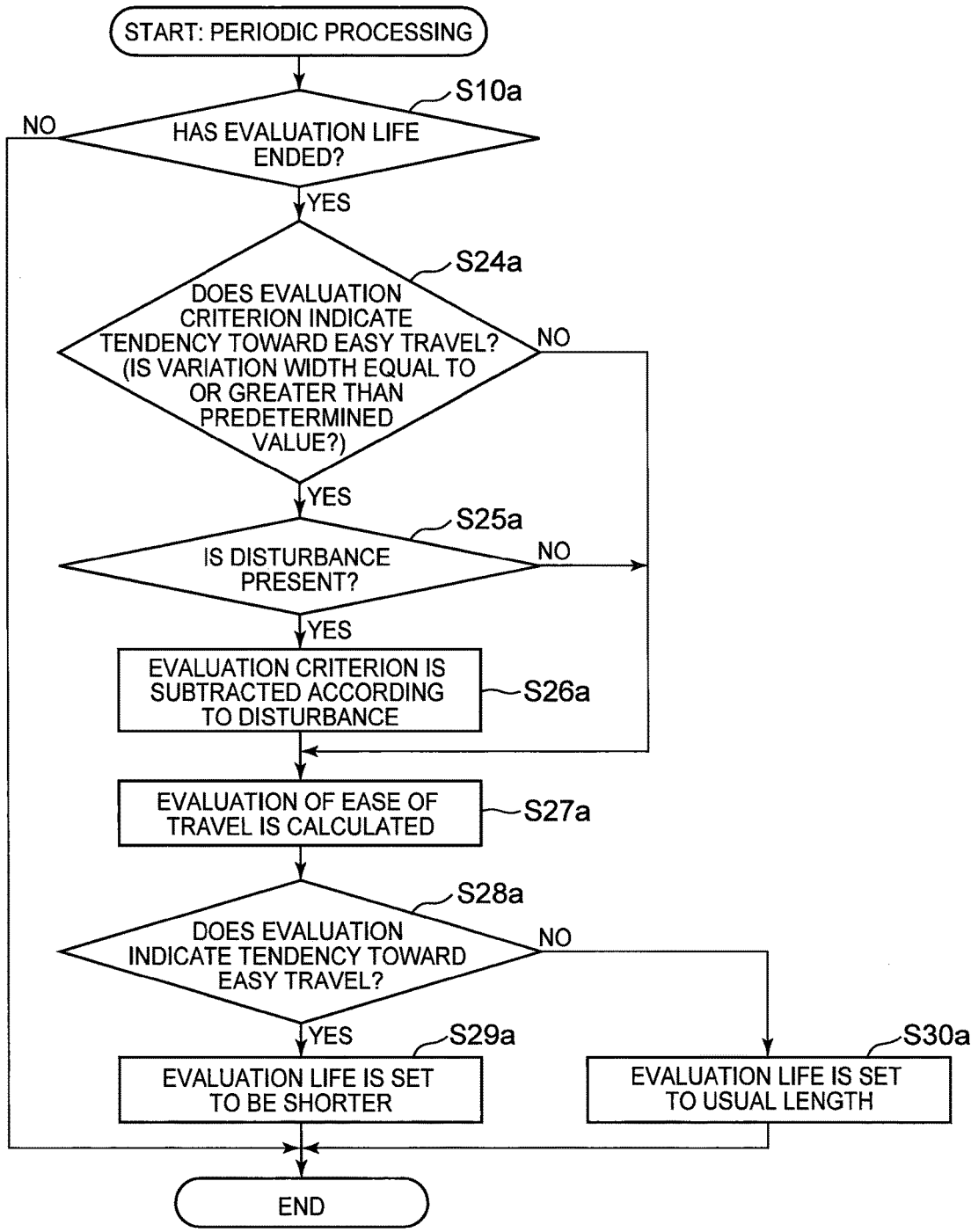
FIG. 13 is a flowchart illustrating the processing sequence of update processing executed by the vehicle drive assist system of the third embodiment when updating the evaluation relating to ease of travel on a road.

Further, as depicted in FIG. 13, in step S10a and steps S24a to S30a, the management center 200 periodically updates the correction amount of the evaluation criterion for each predetermined area according to the disturbance factors B1a in this case, in the same manner as in the processing of step S10 and step S24 to step S30 (FIG. 9) in the first embodiment.

Therefore, in the third embodiment, the following effect can be obtained in addition to the effect of the first embodiment. (18) When the evaluation relating to ease of travel in each predetermined area is updated, the correction amount of the evaluation criterion corresponding to the disturbance information Ba of the corresponding area is selectively updated. Therefore, the unnecessary increase in the processing load on the entire system which is required to update the evaluation relating to ease of travel is suppressed.

Fourth Embodiment

The fourth embodiment of the vehicular drive assist system will be explained hereinbelow with reference to the appended drawings. The fourth embodiment differs from the first to third embodiments in that the evaluation criterion setting unit is provided in the management center, whereas the evaluation calculation unit is provided in the vehicle itself. Therefore, in the explanation below, for the sake of convenience, mainly the features that are different from those of the first embodiment are explained, and the redundant explanation of features which are same or corresponding to those of the first embodiment is omitted.

In the vehicular drive assist system of the embodiment, the management center evaluates the ease of travel for each predetermined area on the basis of information relating to static factors of road environment. Meanwhile, at the vehicle, the evaluation relating to ease of travel in each area which is wireless transmitted from the management center is corrected on the basis of information on the disturbance factors which has been acquired each time the vehicle itself travelled in each area. The drive assist at the time the vehicle travels in each corresponding area is then performed on the basis of the corrected evaluation relating to ease of travel in each area.

Figure 14:
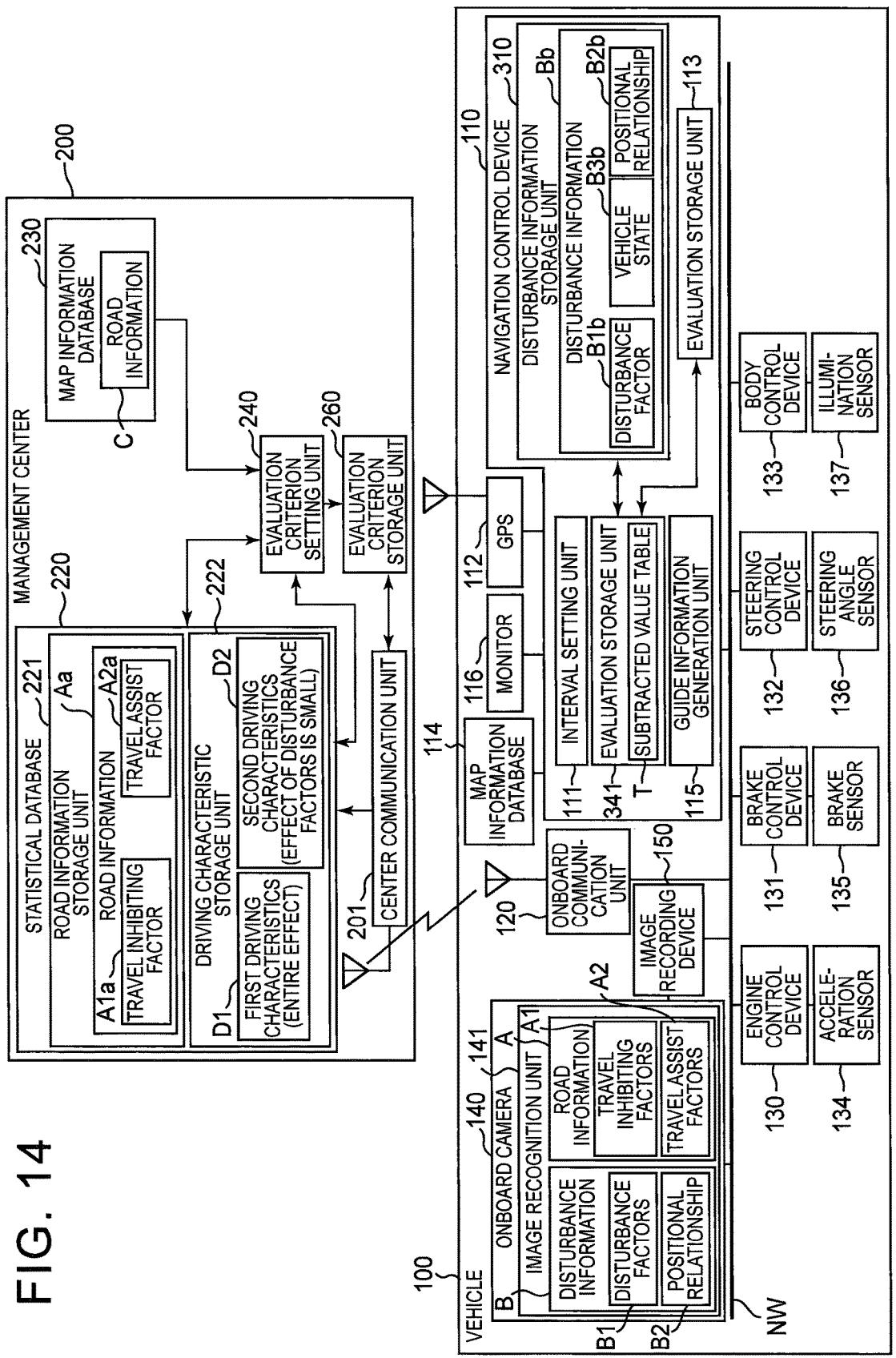
FIG. 14 is a block diagram illustrating the general configuration of the vehicle drive assist system of the fourth embodiment.

More specifically, as depicted in FIG. 14, the management center 200 is provided with an evaluation criterion storage unit 260 instead of the evaluation storage unit 242. The evaluation criterion setting unit 240 stores in the evaluation criterion storage unit 260 the evaluation criterion which has been corrected using the driving characteristics D1, D2 stored in the driving characteristic storage unit 222 of the statistical database 220 or the road information Aa stored in the road information storage unit 221 of the statistical database 220. Further, the management center 200 reads the evaluation criterion for each predetermined area from the evaluation criterion storage unit 260 and wireless transmits the evaluation criterion, which has been read, to the vehicle 100 through the center communication unit 201.

Meanwhile, the navigation control device 110 of the vehicle 100 is provided with a disturbance information storage unit 310 that stores disturbance information Bb which has been acquired through the onboard camera 140. In the disturbance information Bb, disturbance factors B1b or positional relationships B2b of the disturbance factors B1b with the vehicle 100 are associated with a vehicle state B3b based on the outputs from various onboard control devices which are obtained at the time those types of information are acquired. Further, the navigation control device 110 of the vehicle 100 is provided with an evaluation calculation unit 341 that calculates the evaluation relating to ease of travel in each area by using the disturbance information Bb acquired from the disturbance information storage unit 310 and subtracting the evaluation criterion which has been wireless transmitted from the management center 200. Once the evaluation relating to ease of travel has been calculated, the evaluation calculation unit 341 stores the calculation result in the evaluation storage unit 113.

Figure 15:
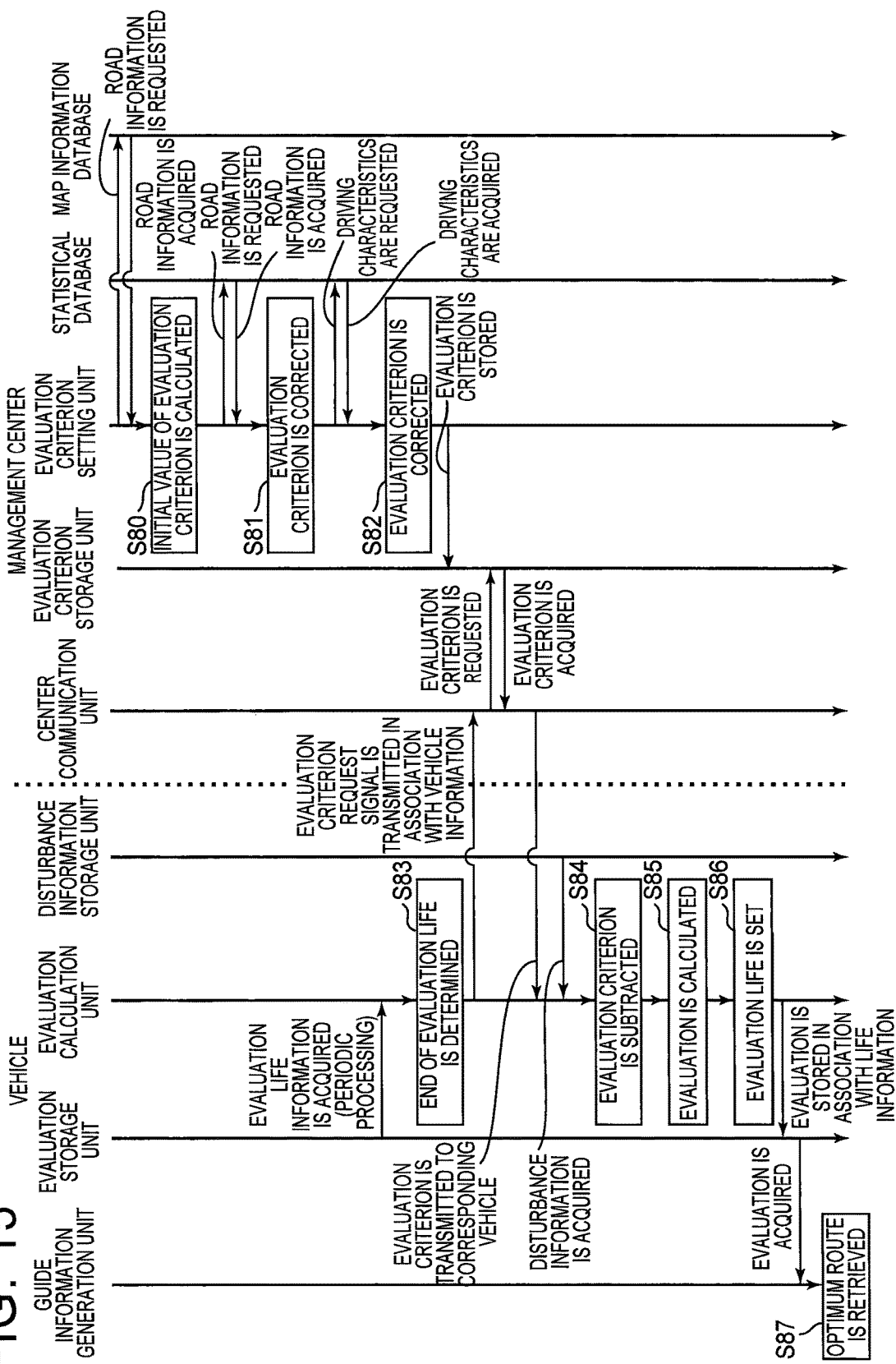
FIG. 15 is a sequence chart illustrating the flow of information when the vehicular drive assist system of the fourth embodiment executes the drive assist processing.

Further, as depicted in FIG. 15, in the embodiment, the evaluation criterion setting unit 240 periodically accesses the map information database 230 and periodically acquires the road information C for each predetermined area from the map information database 230. The evaluation criterion setting unit 240 calculates the initial value of the evaluation criterion of the corresponding area on the basis of the road information C which has thus been acquired (step S80).

Then, the evaluation criterion setting unit 240 accesses the statistical database 220 and acquires the road information Aa corresponding to the same area from the statistical database 220. The evaluation criterion setting unit 240 then corrects the evaluation criterion of the corresponding area on the basis of the road information Aa which has thus been acquired (step S81).

Then, the evaluation criterion setting unit 240 accesses the statistical database 220 and acquires driving characteristics D1, D2 corresponding to the same area from the statistical database 220. Then, the evaluation criterion setting unit 240 further corrects the evaluation criterion of the corresponding area on the basis of the driving characteristics D1, D2 which have thus been acquired (step S82). The evaluation criterion setting unit 240 then stores the corrected evaluation criterion for each predetermined area in the evaluation criterion storage unit 260.

Meanwhile, the evaluation calculation unit 341 periodically acquires life information on the evaluation relating to ease of travel in each predetermined area from the evaluation storage unit 113. In this case, the evaluation calculation unit 341 triggered by the determination that the evaluation life thus acquired has ended (step S83) requests an evaluation criterion of the corresponding area from the evaluation criterion storage unit 260 through the center communication unit 201. The evaluation calculation unit 341 then acquires the evaluation criterion on the same area from the evaluation criterion storage unit 260 through the center communication unit 201. The evaluation calculation unit 341 also acquires the disturbance information Bb corresponding to the same area from the disturbance information storage unit 310. The evaluation calculation unit 341 also subtracts the evaluation criterions of the same area according to the disturbance information Bb (step S84) and calculates the subtracted evaluation criterion as an evaluation relating to ease of travel in the same area (step S85).

The evaluation calculation unit 341 then sets the life of the evaluation according to the evaluation relating to ease of travel in the corresponding area (step S86) and stores the evaluation relating to ease of travel in the same area in the evaluation storage unit 113 in association with the life information. Then, the navigation control device 110 reads, as necessary, the evaluation relating to ease of travel from the evaluation storage unit 113 and retrieves the optimum route for travel intervals of the vehicle 100 while referring to the evaluation relating to ease of travel which has been read (step S87).

Therefore, in the fourth embodiment, the following effect can be obtained instead of the effect of the first embodiment described in section (16) hereinabove. (16A) The information relating to static factors of road environment, which is general-purpose information for most vehicles, is managed integrally by the management center 200. Therefore, the processing load on the entire system is reduced by comparison with the case in which general-purpose information is managed by individual vehicles. Meanwhile, the information on disturbance factors which is information suitable individually to each vehicle is managed individually by each vehicle 100. Therefore, the processing load of the entire system is prevented from concentrating on the management center 200.

Fifth Embodiment

The fifth embodiment of the vehicular drive assist system will be explained hereinbelow with reference to the appended drawings. The fifth embodiment differs from the first to fourth embodiment in that the entire vehicular drive assist system is installed on one vehicle. Therefore, in the explanation below, for the sake of convenience, mainly the features that are different from those of the first embodiment are explained, and the redundant explanation of features which are same or corresponding to those of the first embodiment is omitted.

The vehicular drive assist system of the embodiment is provided on the host vehicle, and the vehicle evaluates the ease of travel in each predetermined area on the basis of information relating to static factors of road environment. Further, the vehicle corrects the evaluation relating to ease of travel in each area on the basis of information on disturbance factors that has been acquired each time the vehicle travelled through each area. The vehicle feeds back to itself the evaluation relating to ease of travel in each area, which has thus been corrected, thereby enabling drive assist when the vehicle travels through each corresponding area.

Figure 16:
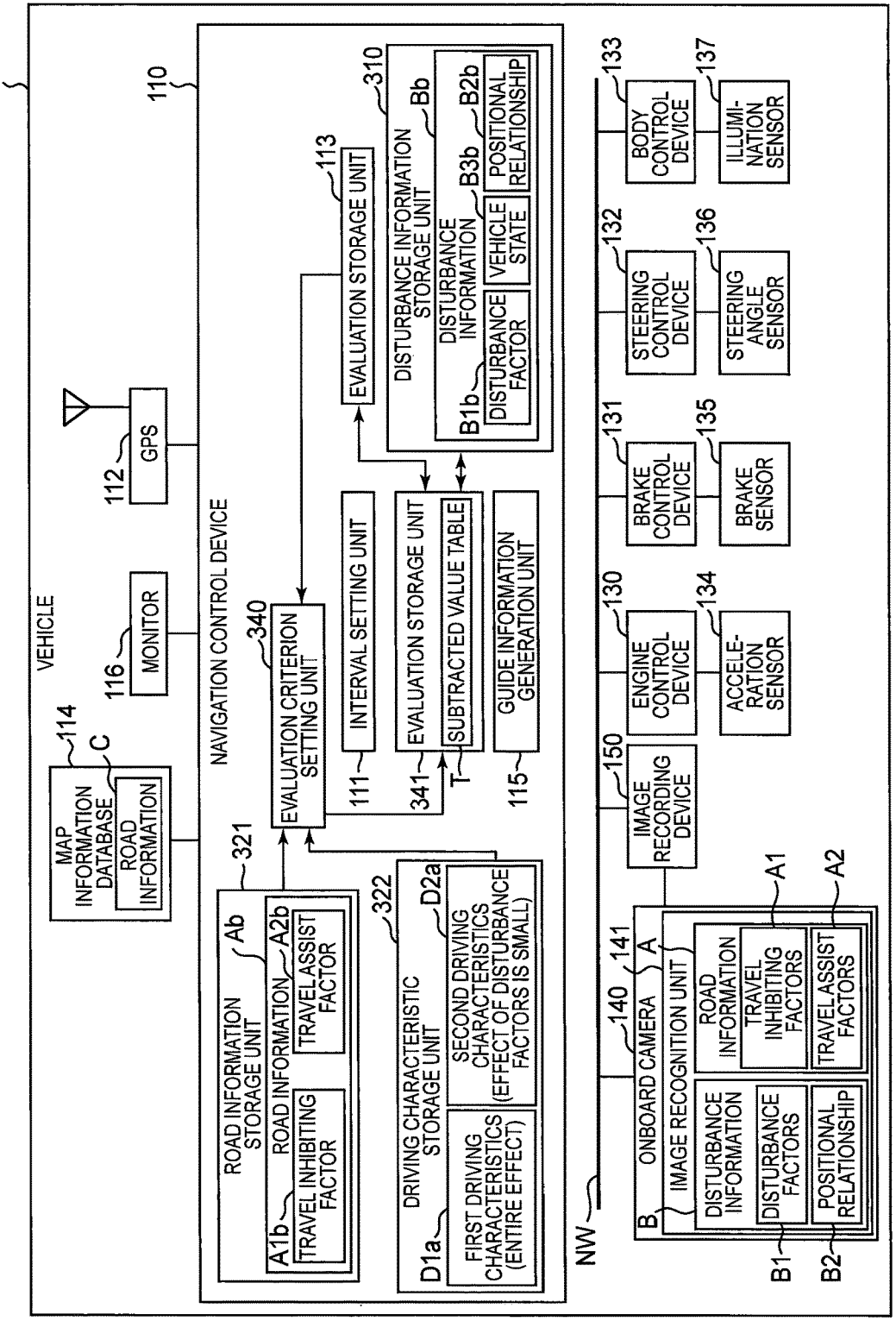
FIG. 16 is a block diagram illustrating the general configuration of the vehicle drive assist system of the fifth embodiment.

More specifically, as depicted in FIG. 16, the navigation control device 110 of the vehicle 100 is provided with a road information storage unit 321 that classifies road information Ab for each predetermined area, which has been acquired through the onboard camera 140, into travel inhibiting factors A1b and travel assist factors A2b, and stores the classified information. The vehicle 100 may acquire the road information Ab for each predetermined area through vehicle-to-vehicle communication with another vehicle or road-to-vehicle communication with road equipment.

Further, the navigation control device 110 of the vehicle 100 is provided with a driving characteristic storage unit 322 that stores driving characteristics D1a, D2a for each predetermined area which have been acquired through various onboard control devices during the running of the vehicle 100. Information also inclusive of the information acquired through vehicle-to-vehicle communication with another vehicle may be acquired, as statistical information, by the vehicle 100 with respect to the driving characteristics D1a, D2a for each predetermined area.

Further, the navigation control device 110 of the vehicle 100 is also provided with a disturbance information storage unit 310 which stores disturbance information Bb acquired through the onboard camera 140. In the disturbance information Bb, the disturbance factors B1b or positional relationships B2b of those disturbance factors B1b with the vehicle 100 are associated with the vehicle state B3b based on the outputs from various onboard control devices which are obtained at the time those types of information are acquired.

Further, as depicted in FIG. 17, in the embodiment, the evaluation criterion setting unit 340 periodically acquires life information on the evaluation relating to ease of travel in each predetermined area from the evaluation storage unit 113. In this case, the evaluation criterion setting unit 340 triggered by the determination that the evaluation life thus acquired has ended (step S90) accesses the map information database 114 and acquires the road information C corresponding to the area which has been the determination object from the map information database 114. Then, the evaluation criterion setting unit 340 calculates the initial value of the evaluation criterion of the corresponding area on the basis of the road information C which has thus been acquired (step S91).

The evaluation criterion setting unit 340 then acquires road information Ab corresponding to the same area from the road information storage unit 321. The evaluation criterion setting unit 340 then corrects the evaluation criterion of the corresponding area on the basis of the road information Ab that has thus been acquired (step S92).

The evaluation criterion setting unit 340 then acquires driving characteristics D1a, D2a corresponding to the same area from the driving characteristic storage unit 322. The evaluation criterion setting unit 340 then further corrects the evaluation criterion of the corresponding area on the basis of the driving characteristics D1a, D2a that have thus been acquired (step S93).

Then, the evaluation calculation unit 341 acquires the evaluation criterion of the corresponding area from the evaluation criterion setting unit 340 and acquires the disturbance information Bb corresponding to the same area from the disturbance information storage unit 310. The evaluation calculation unit 341 then subtracts the evaluation criterion of the corresponding area according to the disturbance information Bb (step S94) and calculates the subtracted evaluation criterion as an evaluation relating to ease of travel in the same area (step S95).

Then, the evaluation calculation unit 341 sets the life of evaluation according to the evaluation relating to ease of travel in the corresponding area (step S96) and stores the evaluation relating to ease of travel in the same area in the evaluation storage unit 113 in association with the life information. Then, the guide information generation unit 115 reads, as necessary, the evaluation relating to ease of travel from the evaluation storage unit 113 and retrieves the optimum route of travel intervals of the vehicle 100 while referring to the evaluation relating to ease of travel which has thus been read (step S97).

Therefore, in the fifth embodiment, the following effect can be obtained instead of the effect of the first embodiment described in section (16). (16B) Since the vehicle itself has a function of evaluating the ease of travel on the road, no communication between the vehicle and the outside is required for such evaluation. Therefore, although a load on the onboard devices is increased, the evaluation can be stably performed regardless of the communication environment of the vehicle and the outside.

Other Embodiments

The above-described embodiments can be also implemented in the following modes.

In the embodiments, the evaluation life may be uniformly set, regardless of the height of the evaluation relating to ease of travel in the areas, with consideration for the processing load on the entire system which is required for updating the evaluation relating to ease of travel.

In the embodiments, the degree of separation between the tendency of ease of travel which is based on the evaluation criterion and the driving tendency which is based on the driving characteristics of the vehicle may be determined without taking into account the effect of disturbance factors demonstrated at the time the driving characteristics of the vehicle are acquired.

In the embodiments, the evaluation criterion for each area may be set without taking into account the driving characteristics of the vehicle.

In the embodiments, the evaluation relating to ease of travel in each area may be calculated by taking into account the disturbance factors with respect to the correction value of the evaluation criterion for each area, regardless of whether or not the variation width of the evaluation relating to ease of travel is equal to or higher than a predetermined value.

In the embodiments, the road information A may be acquired with cameras installed on the road, for example, at intersections, or the road information A included in the map information which is publicly available on the internet may be acquired through an internet circuit.

In the embodiments, the downward correction of the evaluation criterion which is based on the travel inhibiting factors A1$a$, A1$b$ and the upward correction of the evaluation criterion which is based on the travel assist factors A2$a$, A2$b$ may be uniformly performed regardless of the initial value of the evaluation criterion which has been provisionally determined on the basis of road information C.

In the embodiments, the evaluation criterion may be calculated on the basis of only the road information included in the map information, or on the base of only the road information that is not included in the map information.

In the embodiments, the evaluation relating to ease of travel in each area may be calculated by taking into account weather information relating to vehicle surroundings. In this case, weather information may be handled as a static factor or as a dynamic factor.

In the embodiments, when the disturbance factors which are taken into account when the evaluation of ease of travel is performed are constituted only by factors that assist the ease of travel on the road, the variation width of the evaluation relating to ease of travel may be restricted to a range equal to or higher than the evaluation criterion by taking the evaluation criterion calculated on the basis of road information as a lower limit value.

In the embodiments, when the disturbance factors which are taken into account when the evaluation of ease of travel is performed are constituted by both the factors that assist the ease of travel on the road and the factors that degrade the ease of travel on the road, the variation width of the evaluation relating to ease of travel may be restricted from above and below to a range including the evaluation criterion calculated on the basis of road information.

In the embodiments, the drive assist based on the evaluation relating to ease of travel on a road may not be limited to route guidance for a vehicle, and may be, for example, a warning issued to the driver before the vehicle enters an intersection with a low evaluation.

What is claimed is:

1. A vehicular drive assist system comprising at least one processor that is programmed to:
   perform drive assist for a vehicle traveling in each predetermined area while receiving a feedback on evaluation relating to ease of travel on a road in each of the areas, as a result of the evaluation relating to ease of travel being represented by a value in a range of values indicating a degree of ease of travel on the road in each of the areas, wherein:
   a variation width of the evaluation relating to ease of travel, which is to be fed back, is restricted based on static factors of road environment for each of the areas;
   the variation width is a width of the range of values within which the value representing the evaluation changes by taking into account a disturbance factor of the road;
   information relating to the static factors of road environment is constituted by (i) information relating to static factors of road environment which are included in map information and (ii) information relating to static factors of road environment which are not included in map information;
   the value of the evaluation relating to ease of travel is provisionally determined based on the information relating to static factors of road environment which are included in map information; and
   the provisionally determined value of the evaluation is corrected based on the information relating to static factors of road environment which are not included in map information.

2. The vehicular drive assist system according to claim 1, wherein:
   the information relating to static factors of road environment which are not included in map information includes (i) travel inhibiting factors which degrade the ease of travel on the road and (ii) travel assist factors which improve the ease of travel on the road;
   the provisionally determined value of the evaluation is decreased based on the travel inhibiting factors; and
   the provisionally determined value of the evaluation is increased based on the travel assist factors.

3. The vehicular drive assist system according to claim 2, wherein
   decreasing the provisionally determined value of the evaluation based on the travel inhibiting factors is performed on condition that the provisionally determined value of the evaluation shows a tendency toward an easy travel, and
   increasing the provisionally determined value of the evaluation based on the travel assist factors is performed on condition that the provisionally determined value of the evaluation shows a tendency toward a difficult travel.

4. The vehicular drive assist system according to claim 1, wherein:
   the information relating to static factors of road environment which are not included in map information is acquired while the vehicle is running.

5. The vehicular drive assist system according to claim 1, wherein
   correction calculation is performed on the evaluation relating to ease of travel by taking into account disturbance factors that change dynamically when the vehicle travels through each area.

6. The vehicular drive assist system according to claim 5, wherein
   an amount of correction made to the evaluation relating to ease of travel, by taking into account the disturbance factors, is determined in advance for each disturbance factor affecting the ease of travel on the road.

7. The vehicular drive assist system according to claim 6, wherein
when the disturbance factors are located around the vehicle, a correction amount corresponding to each of positional relationships between the disturbance factors and the vehicle is selected.

8. The vehicular drive assist system according to claim 6, wherein
when the disturbance factors and a state of the vehicle are associated with each other, a correction amount corresponding to each combination of the associated disturbance factors and the state of the vehicle is selected.

9. The vehicular drive assist system according to claim 8, wherein
when the disturbance factor assists the ease of travel on the road for the state of the vehicle, the evaluation relating to ease of travel is corrected to be higher according to the disturbance factor.

10. The vehicular drive assist system according to claim 5, wherein
correction calculation that takes into account a disturbance factor that changes dynamically when the vehicle travels through an area is executed only when the variation width of the evaluation relating to ease of travel is equal to or greater than a predetermined value in the area.

11. The vehicular drive assist system according to claim 1, wherein
when a degree of separation of a tendency of ease of travel, which is based on evaluation relating to ease of travel in a certain specific area, and a tendency of ease of travel, which is based on driving characteristics of the vehicle corresponding to the same area, is equal to or greater than a predetermined value, the evaluation relating to ease of travel in the same area is corrected such that the degree of separation is decreased.

12. The vehicular drive assist system according to claim 11, wherein:
the driving characteristics of the vehicle are set in association with information on disturbance factors of the vehicle when the driving characteristics are acquired;
the information on disturbance factors includes information regarding which one of a plurality of classes the driving characteristics belong to, the plurality of classes being classified in accordance with a degree of effect of the disturbance factors, and the plurality of classes including at least (i) a first class in which the effect of the disturbance factors is comparatively small with respect to a second class, and (ii) the second class in which the effect of the disturbance factors is comparatively large with respect to the first class;
a driving characteristic that belongs to the first class is extracted from among the driving characteristics of the vehicle corresponding to a certain specific area when the evaluation relating to ease of travel in this area shows a tendency toward an easy travel; and
the degree of separation is determined with respect to (i) a tendency of ease of travel, which is based on the extracted driving characteristic, and (ii) a tendency of ease of travel, which is based on the evaluation relating to ease of travel in the same area.

13. The vehicular drive assist system according to claim 1, wherein
the evaluation relating to ease of travel is updated for each area based on a preset life, and
when evaluation relating to ease of travel in a specific area shows a tendency toward an easy travel, a life of the evaluation of the specific area is set to be shorter than when the evaluation relating to ease of travel in the specific area shows a tendency toward a difficult travel.

\* \* \* \* \*